(12) United States Patent
Sawyer et al.

(10) Patent No.: US 11,139,998 B2
(45) Date of Patent: Oct. 5, 2021

(54) BUILDING MANAGEMENT SYSTEM WITH DYNAMIC CONTROL SEQUENCE AND PLUG AND PLAY FUNCTIONALITY

(71) Applicant: Johnson Controls Technology Company, Auburn Hills, MI (US)

(72) Inventors: Jason T. Sawyer, Greendale, WI (US); Judhajit Sarkar, Kolkata (IN)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 16/439,557

(22) Filed: Jun. 12, 2019

(65) Prior Publication Data
US 2020/0028702 A1    Jan. 23, 2020

Related U.S. Application Data

(60) Provisional application No. 62/699,652, filed on Jul. 17, 2018.

(51) Int. Cl.
*G05B 15/02*    (2006.01)
*H04L 12/28*    (2006.01)
*G06F 3/0484*    (2013.01)

(52) U.S. Cl.
CPC ............ *H04L 12/282* (2013.01); *G05B 15/02* (2013.01); *G06F 3/04847* (2013.01); *H04L 12/2814* (2013.01); *G05B 2219/23067* (2013.01)

(58) Field of Classification Search
CPC ............. G06F 3/04847; H04L 12/2814; H04L 12/282; H04L 12/413
See application file for complete search history.

(56) References Cited

U.S. PATENT DOCUMENTS

| | | | |
|---|---|---|---|
| 7,526,539 B1 * | 4/2009 | Hsu | H04L 12/2818 709/203 |
| 2009/0057424 A1 * | 3/2009 | Sullivan | F24F 11/30 236/51 |
| 2017/0300193 A1 | 10/2017 | Ray et al. | |
| 2017/0329292 A1 | 11/2017 | Piaskowski et al. | |
| 2018/0101158 A1 | 4/2018 | Guthrie et al. | |
| 2018/0205567 A1 | 7/2018 | Piaskowski et al. | |
| 2018/0259934 A1 | 9/2018 | Piaskowski et al. | |

* cited by examiner

*Primary Examiner* — Yuhui R Pan
(74) *Attorney, Agent, or Firm* — Foley & Lardner LLP

(57) ABSTRACT

A Building Management System (BMS) generates and presents a user interface to a user. The user interface displays building automation and control logic as human-readable text including interactive text modifiable by the user. The user interface allows the user to more easily understand complex control logic and make modifications to the control logic. The BMS is also presents equipment graphics on the user interface based on metadata read from controllers. The controller metadata includes information about building equipment operated by the controller and one or more sensors associated with the building equipment.

20 Claims, 22 Drawing Sheets

1400

1402

| EDIT | SYSTEM INFO | |
|---|---|---|
| ATTRIBUTE | VALUE | |
| SYSTEM 1 | | |
|   NAME | AHU-1 | |
|   ENABLED | TRUE ▼ | |
| SETUP | | |
|   REVISION | DATE — MONDAY, JULY 31, 2017<br>TIME — 01:49:22 PM | |
|   STANDARD VERSION | 10.3.0.1523 | |
|   LANGUAGE | ENGLISH (UNITED STATES) | |
|   UNIT SET | IP | |
| RELATIONSHIPS | | |
| EQUIPMENT RELATION (ISFEDBY) | #EQUIP | |
| EQUIPMENT RELATION (ISPARTOF) | #EQUIP | |
| DEVICE RELATION (ISCONTROLLEDBY) | #DEVICE | |
| SPATIAL RELATION (FEEDS) | #DEVICE | |
| SPATIAL RELATION (ISLOCATEDIN) | #SPACE | |

1410 — RELATIONSHIPS

FIG. 14

BUILDING MANAGEMENT SYSTEM WITH DYNAMIC CONTROL SEQUENCE AND PLUG AND PLAY FUNCTIONALITY

CROSS-REFERENCE TO RELATED PATENT APPLICATION

This application claims the benefit of and priority to U.S. Provisional Patent Application No. 62/699,652 filed Jul. 17, 2018, the entire disclosure of which is incorporated by reference herein.

BACKGROUND

The present disclosure relates generally to a building control system and more particularly to a Building Management System (BMS) or Building Automation System (BAS). A BMS is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof. These systems can require significant amounts of time and effort to configure properly. In addition, users may struggle to understand all of the information contained in such systems.

SUMMARY

One implementation of the present disclosure is a method for controlling building equipment in a BMS. The method includes presenting a user interface to a user on a user device; displaying, on the user interface, building automation and control logic associated with the building equipment as human-readable text, the human-readable text including a written narrative that describes one or more functions performed by the building equipment in accordance with the building automation and control logic; providing, on the user interface, interactive text within the human-readable text, the interactive text modifiable by the user; displaying, on the user interface, live building automation and control data associated with the building equipment; receiving, via the user interface, an input from the user responsive to an interaction between the user and the interactive text; modifying, by the BMS, the building automation and control logic in accordance with the user input; and executing, by a controller of the BMS, the building automation and control logic to control the building equipment.

Another implementation of the present disclosure is a BMS. The BMS includes one or more computer-readable storage media having instructions stored thereon that, when executed by one or more processors, cause the one or more processors to present a user interface to a user on a user device; display, on the user interface, building automation and control logic associated with the building equipment as human-readable text, the human-readable text including a written narrative that describes one or more functions performed by the building equipment in accordance with the building automation and control logic; provide, on the user interface, interactive text within the human-readable text, the interactive text modifiable by the user; display, on the user interface, live building automation and control data associated with the building equipment; receive, via the user interface, an input from the user responsive to an interaction between the user and the interactive text; modify, by the BMS, the building automation and control logic in accordance with the user input; and execute, by a controller of the BMS, the building automation and control logic to control the building equipment.

Yet another implementation of the present disclosure is a method performed by a BMS. The method includes detecting that a new controller has been connected to a building network; reading metadata from the new controller, the metadata including information about building equipment controlled by the new controller and one or more sensors associated with the building equipment; generating a graphic of the building equipment, the graphic including live data from the one or more sensors; presenting the graphic to a user of the BMS on a user interface; receiving, via the user interface, an input from the user; and operating the building equipment in accordance with the input.

Those skilled in the art will appreciate this summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 14 is a drawing of an example system information interface associated with the BMS of FIG. 4, according to some embodiments.

DETAILED DESCRIPTION

Overview

Referring generally to the FIGURES, a building management system (BMS) with dynamic control sequence and plug and play functionality is shown, according to some embodiments. The dynamic control sequence functionality allows users of the BMS to easily understand and modify complex control logic. The plug and play functionality leverages data across the BMS data to automate various processes.

Users of a BMS may have limited experience and knowledge regarding building automation and control systems. For example, a BMS operator may not have the experience or training necessary to understand various control sequences that automate the operation of an air handling unit (AHU). In addition, the BMS operator may not have a working knowledge of computer programming that is necessary to understand control logic. However, a BMS can be configured to present a dynamic control sequence interface that presents control sequences as human-readable text. For example, as an alternative to computer code, ladder logic, or function block logic, the human-readable text can present a control sequence associated with the BMS as a sentence or collection of sentences. In addition, some of the human-readable text can be interactive text. This interactive text can be selected by users in order to view data or modify logic associated with a control sequence. As a result of this dynamic control sequence interface, the BMS becomes more intuitive and user-friendly.

In addition, users of a BMS may be required to enter the same information multiple times to properly configure the BMS. For example, if a building space is renovated (e.g., new conference room), it may be necessary to program a controller associated with the building space. In addition, it may be necessary to re-enter much of the information used to program the controller. For example, in order to create equipment graphics or populate a relationship tree, the user may need to enter a variety of information about building equipment controlled by the controller. However, the plug and play functionality can allow the BMS to automatically read a variety of data stored on the controller as metadata. As a result, the same information may not need to be entered multiple times.

Building with HVAC System

Figure 1:
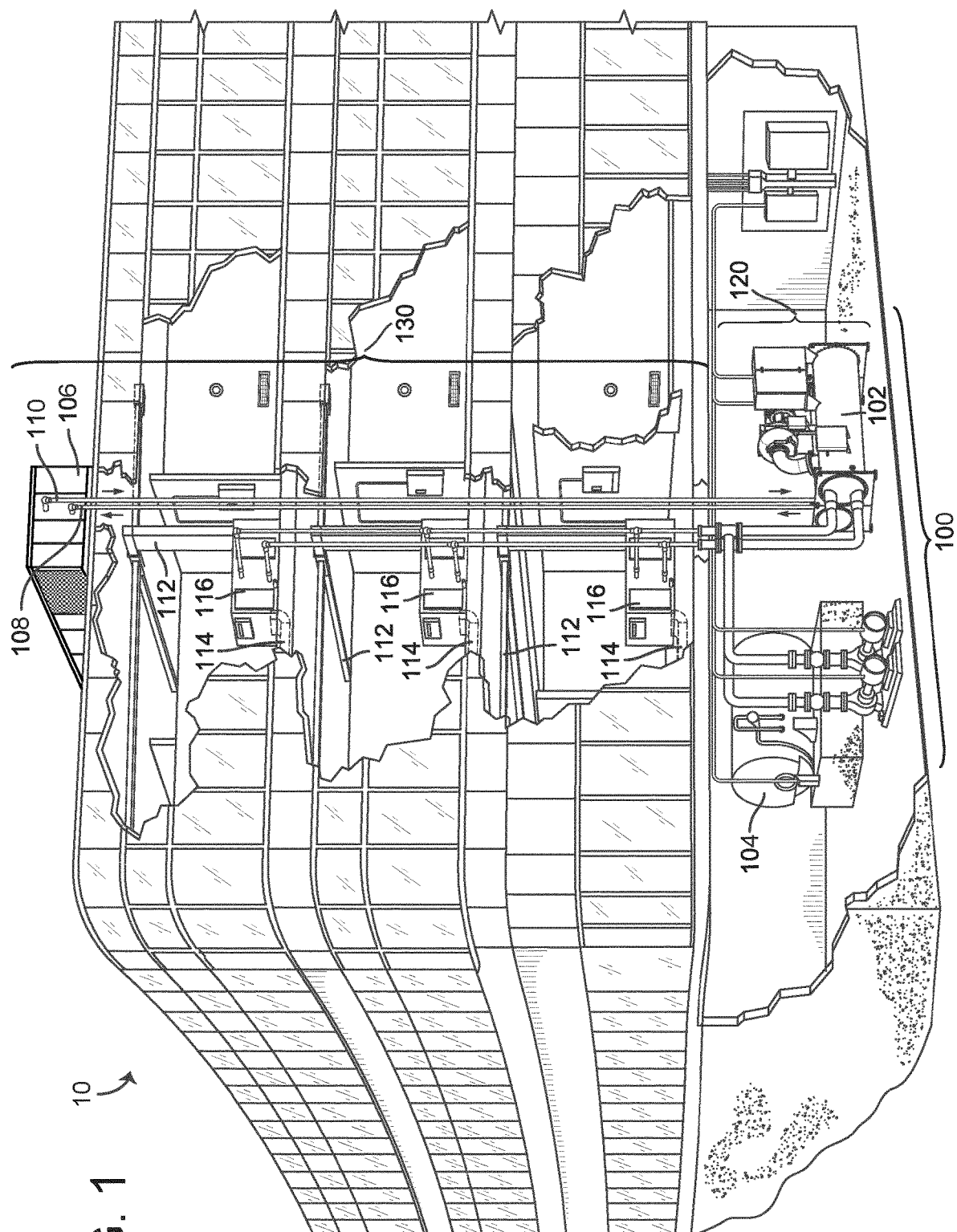
FIG. 1 is a drawing of a building equipped with a HVAC system, according to some embodiments.

Referring now to FIG. 1, a perspective view of a building 10 is shown. Building 10 is served by a building automation system (BAS). A BAS is, in general, a system of devices configured to control, monitor, and manage equipment in or around a building or building area. A BAS can include, for example, a HVAC system, a security system, a lighting system, a fire alerting system, any other system that is capable of managing building functions or devices, or any combination thereof.

The BAS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 is replaced with a central energy plant such as central plant 200, described with reference to FIG. 2.

Still referring to FIG. 1, HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via air supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
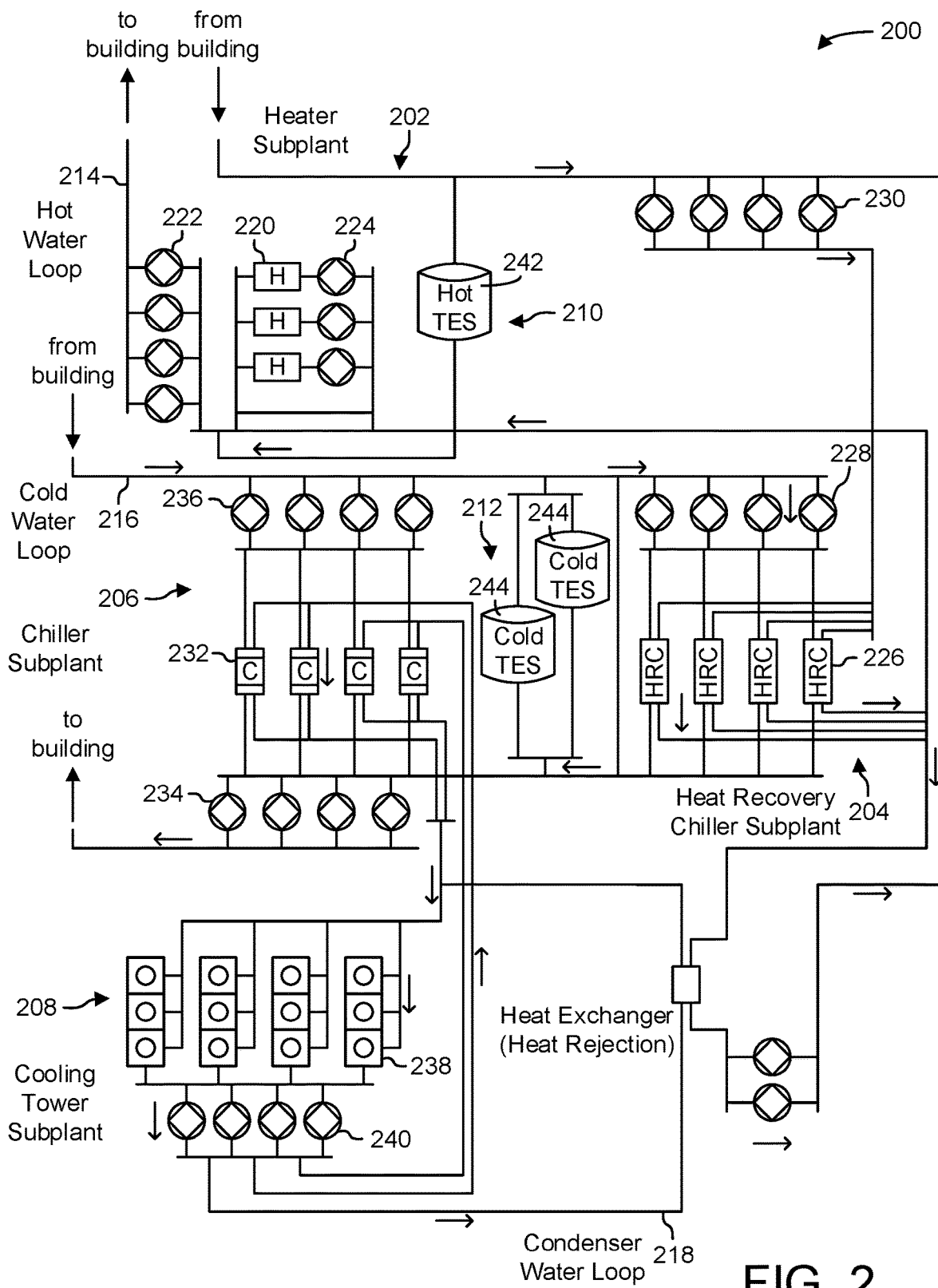
FIG. 2 is a schematic of a waterside system which can be used as part of the HVAC system of FIG. 1, according to some embodiments.

Referring now to FIG. 2, a block diagram of a central plant 200 is shown, according to an exemplary embodiment. In brief overview, central plant 200 may include various types of equipment configured to serve the thermal energy loads of a building or campus (i.e., a system of buildings). For example, central plant 200 may include heaters, chillers, heat recovery chillers, cooling towers, or other types of equipment configured to serve the heating and/or cooling loads of a building or campus. Central plant 200 may consume resources from a utility (e.g., electricity, water, natural gas, etc.) to heat or cool a working fluid that is circulated to one or more buildings or stored for later use (e.g., in thermal energy storage tanks) to provide heating or cooling for the buildings. In various embodiments, central plant 200 may supplement or replace waterside system 120 in building 10 or may be implemented separate from building 10 (e.g., at an offsite location).

Central plant 200 is shown to include a plurality of subplants 202-212 including a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to central plant 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in central plant 200 (e.g., pumps 222, 224, 228, 230, 234, 236, and/or 240) or pipelines in central plant 200 include an isolation valve associated therewith. Isolation valves may be integrated with the pumps or positioned upstream or downstream of the pumps to control the fluid flows in central plant 200. In various embodiments, central plant 200 may include more, fewer, or different types of devices and/or subplants based on the particular configuration of central plant 200 and the types of loads served by central plant 200.

Figure 3:
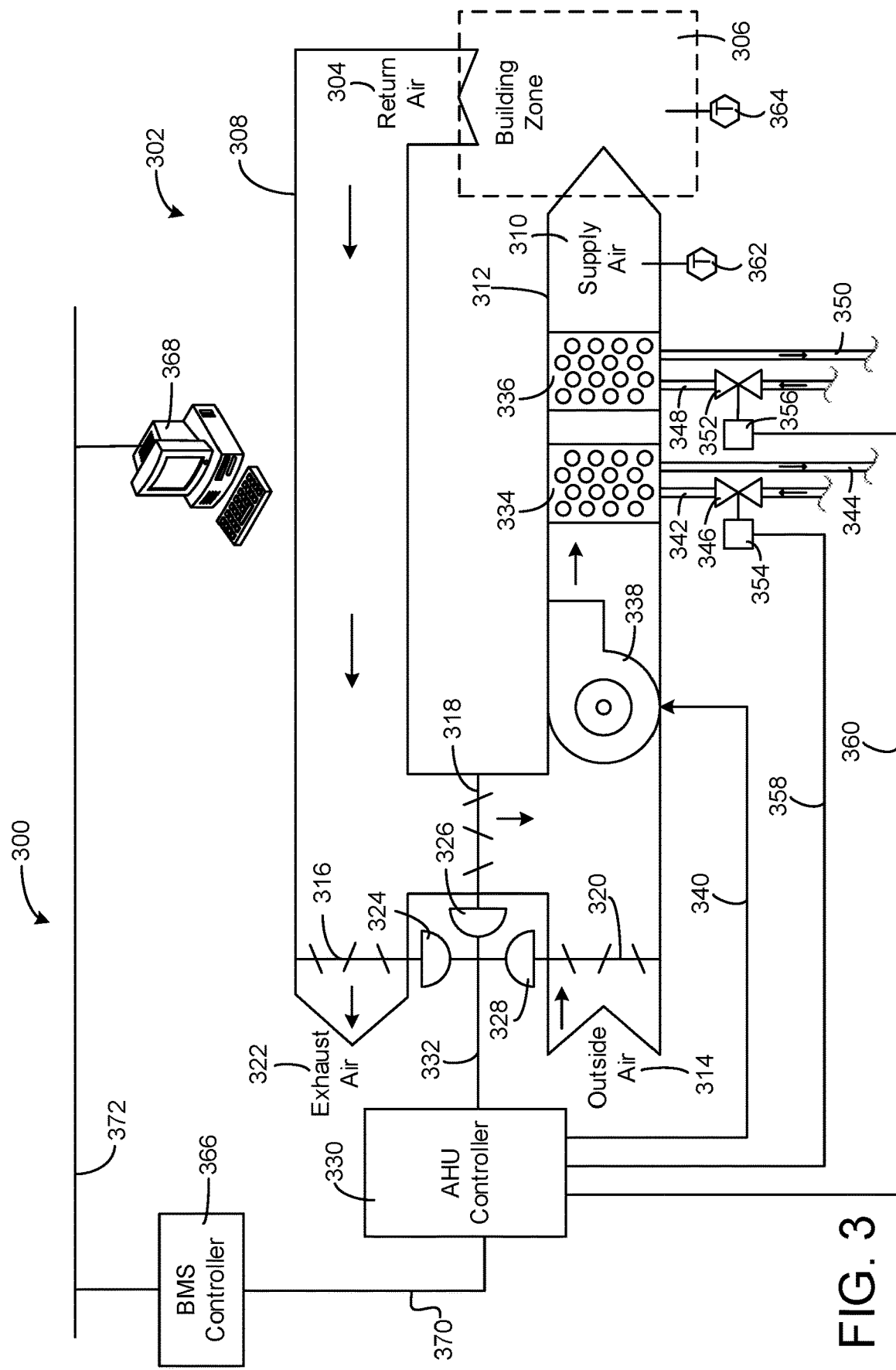
FIG. 3 is a block diagram of an airside system which can be used as part of the HVAC system of FIG. 1, according to some embodiments.

Referring now to FIG. 3, a block diagram of an airside system 300 is shown, according to an example embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, duct 112, duct 114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362 and 364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Building Management System

Figure 4:
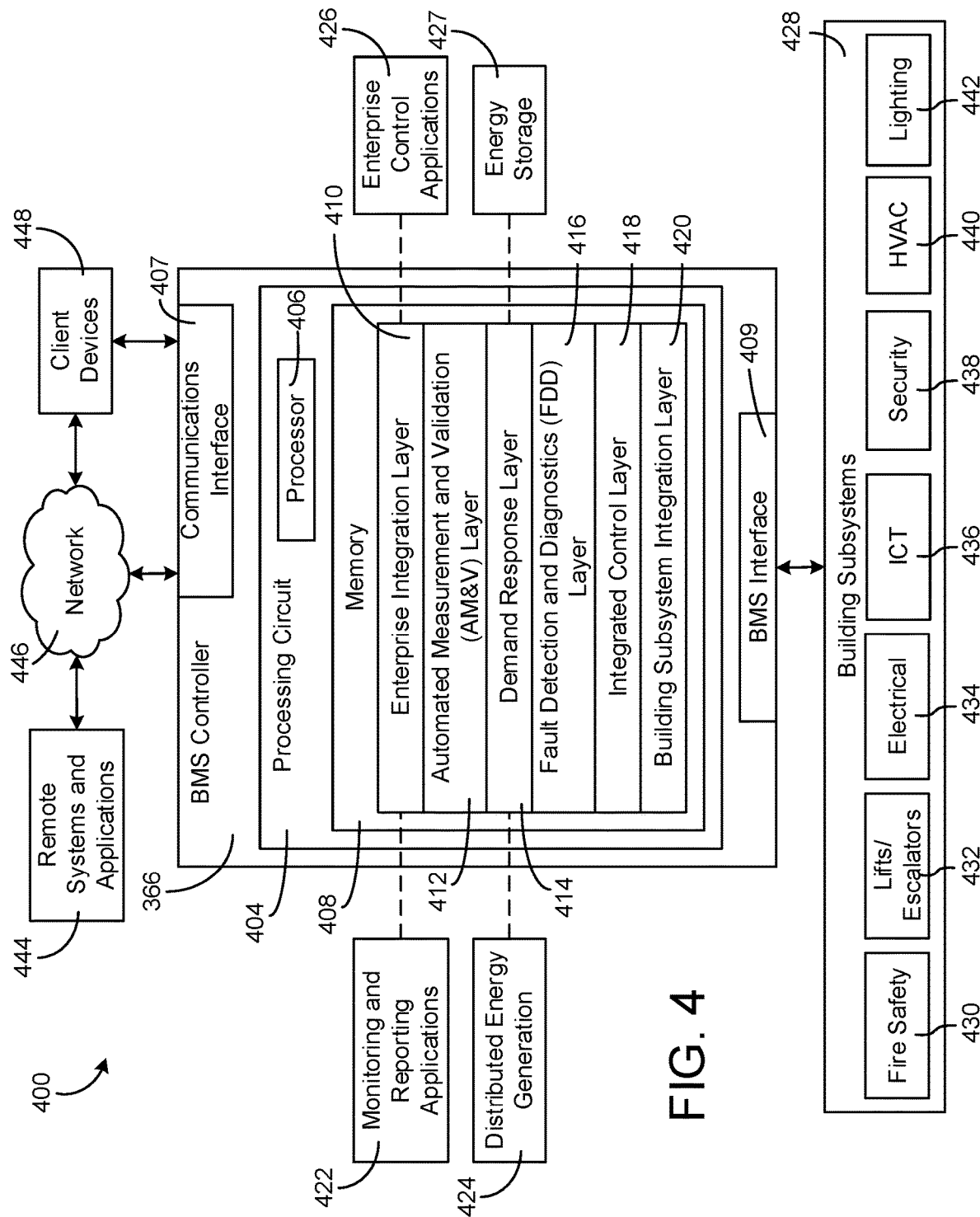
FIG. 4 is a block diagram of a BMS which can be used in the building of FIG. 1, according to some embodiments.

Referring now to FIG. 4, a block diagram of a building management system (BMS) 400 is shown, according to an example embodiment. In some embodiments, BMS 400 is a Metasys Building Automation System as developed by Johnson Controls International plc. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2 and 3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an example embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an example embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an example embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other example embodiments, FDD layer 416 is configured to provide "fault" events to integrated control layer 418 which executes control strategies and policies in response to the received fault events. According to an example embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

BMS with Dynamic Control Sequence and Plug and Play Functionality

Figure 5:
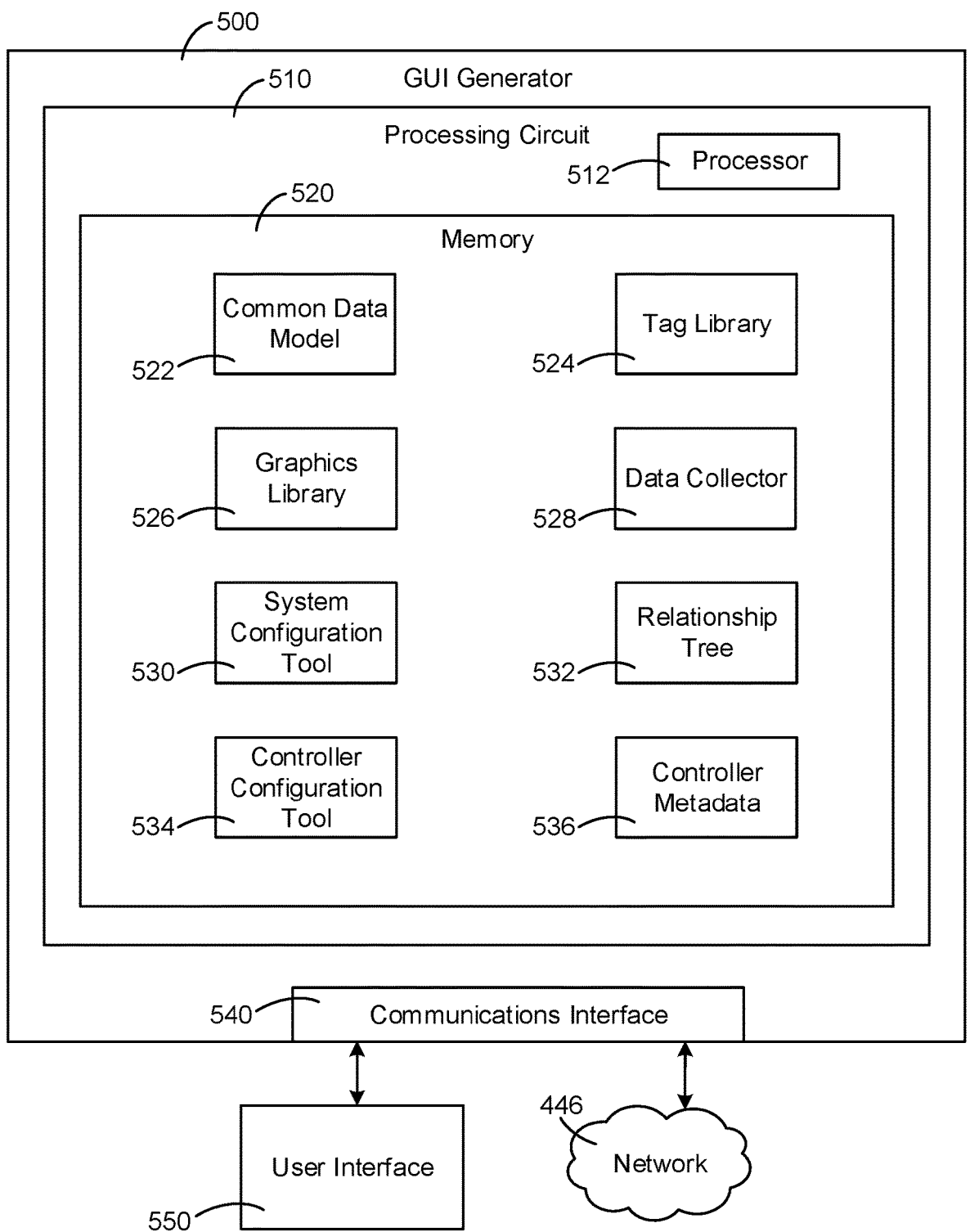
FIG. 5 is a block diagram of a graphical user interface (GUI) generator that can be part of the BMS of FIG. 4, according to some embodiments.

Referring now to FIG. 5, an example graphical user interface (GUI) generator 500 of BMS 400 is shown, according to some embodiments. GUI generator 500 can be configured to generate and present user interface 550 to users of BMS 400. For example, user interface 550 may be presented to a variety of personnel (e.g., commissioning engineer, application engineer, technician, business stakeholder, etc.) in order to interact with BMS 400. In some embodiments, GUI generator 500 is implemented within a single computer (e.g., one server, one housing, etc.). In various other embodiments, GUI generator 500 is distributed across multiple servers or computers (e.g., that can exist in distributed locations). GUI generator 500 can also be implemented as part of a controller (e.g., BMS controller 366) or any other component of BMS 400. Each of the interfaces, graphics, dialog boxes, etc. described below with respect to FIGS. 6-21 are examples of user interface 550.

GUI generator 500 is shown to include a processing circuit 510 with a processor 512, a memory 520, and a communications interface 540. GUI generator 500 can be connected to electronic network 446 via communications interface 540. Also shown is user interface 550 that can be any interface generated by GUI generator 500 and presented to a user to interact with BMS 400. Users may interact with interface 550 through a variety of devices such as a personal computer, laptop, tablet, smartphone, workstation, etc. GUI generator 500 can connect to these user devices via communications interface 540. Communications interface 540 can use any communications protocol to establish this connection (e.g., Wi-Fi, LAN, WAN, etc.). Memory 520 is shown to include a plurality of components such as a common data model 522, a tag library 524, a graphics library 526, a data collector 528, a system configuration tool 530, a relationship tree 532, a controller configuration tool 534, and controller metadata 536.

Common data model 522 can be implemented in BMS 400 in order to define and analyze data requirements needed to support various business processes. Common data model 522 can, for example, define various object definitions, class definitions, and other data requirements associated with BMS 400. Common data model 522 can provide many benefits for users of BMS 400 generally related to leveraging large amounts of information to increase awareness, improve performance, and drive automation. For example, common data model 522 may allow managers, stakeholders, and other personnel to achieve a better understanding of system performance and data available through BMS 400 (e.g., through visualization, common nomenclature, etc.). Common data model 522 may also allow engineers, developers, and other technical personnel to better understand data organization and relationships within BMS 400. As a result, technical personnel may be able to create more effective logic (e.g., automate more processes) and build applications to more effectively leverage building data.

In some embodiments, common data model 522 defines a tag library 524 comprising a set of tags that may be applied to a variety of data structures in BMS 400. For example, tags may be applied to building spaces (e.g., zones, floors), equipment, and points. Common data model 522 may define one or more requirements associated with each type of tag stored in tag library 524. For example, if a user applies an air handler tag to an air handler within a BMS, the user may be required to specify a discharge air temperature tag (e.g., a temperature sensor) associated with that air handler. In addition to the one or more requirements associated with each type of tag, users may have the ability to enter additional, non-required information associated with each tag. Tag library 524 can aid users in building custom logic and applications within BMS 400.

GUI generator 500 is shown to include a graphics library 526 that can be used to generate various equipment graphics and other graphics for presentation to a user via user interface 550. In some embodiments, graphics library 526 is associated with tag library 524. For example, a graphic for an air handler may be stored in graphics library 526 and may be generated each time a user tags a new air handler. In addition, sub-equipment graphics (e.g., sensors, fans, filters) may be generated and displayed on the air handler graphic when a user tags such sub-equipment associated with the air handler. Graphics library 526 may contain building equipment graphics for chillers, boilers, ducts, lighting, fans, compressors, etc. Graphic generation and presentation to a user via user interface 550 can provide visual aids during system commissioning as well as visualization of data once a system has been configured.

GUI generator 500 is shown to include a data collector 528 that can be configured to collect and present real-time data to users of BMS 400 via user interface 550. Data collector 528 may collect data from a variety of points and equipment within a BMS. For example, data collector 528 can retrieve real-time readings from a temperature sensor, flow sensor, supply fan, lighting system, occupancy sensor, etc. Data collected by data collector 528 can also be associated with one or more tags stored in tag library 524, for example. Each tag may specify associated data to collect and a format to store and/or display data as defined by common data model 522.

In some embodiments, BMS 400 includes a system configuration tool 530 that allows users to perform commissioning activities and otherwise configure the BMS. System configuration tool 530 may involve various layers of abstraction in order to present a more human-readable interface for commissioning building systems. For example, tool 530 can allow personnel to create a model of a building space within a BMS without having a detailed understanding of low-level software and data structures that make the building model possible. System configuration tool 530 can include step-by-step wizards to assist users with system configuration. In addition, system configuration tool 530 can allow users to simulate the operation of a system in order to determine if it has been properly configured.

GUI generator 500 is shown to include a relationship tree 532. Relationship tree 532 can include relationships between building zones, floors, spaces, and rooms within BMS 400. For example, relationship tree 532 can indicate that the first floor of an office building includes conference rooms, restrooms, and a kitchen. In addition, relationship tree 532 can include relationships between devices connected to network 446. For example, relationship tree 532 can include relationships between devices such as supervisory controllers and device controllers managed by BMS 400. Relationship tree 532 provides users of BMS 400 with a simple and intuitive way to view and modify various components of a building control system.

GUI generator 500 is shown to include a controller configuration tool 534. Controller configuration tool 534 can be used by users of BMS 400 to generate and modify controller application files, for example. Controller configuration tool 534 can allow users to use standard control logic and/or create custom logic used by controllers such as BMS controller 366 to operate building equipment. In some embodiments, controller configuration tool 534 includes configuration, simulation, and commissioning modes of operation. Various information entered by the user via controller configuration tool 534 and/or contained in a controller application file can be stored on a controller as metadata 536.

Figure 6:
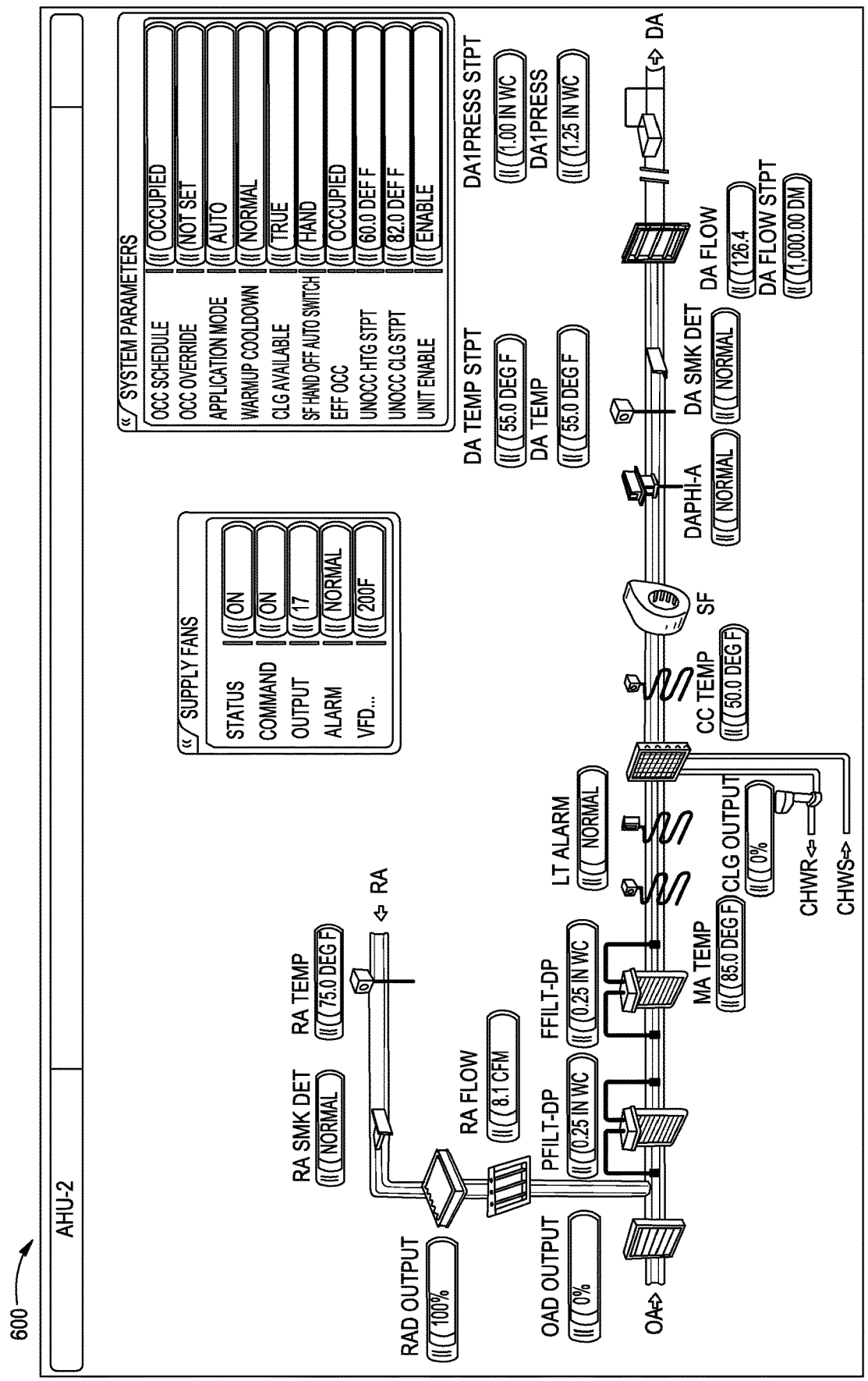
FIG. 6 is a drawing of an example equipment graphic associated with the BMS of FIG. 4, according to some embodiments.

Referring now to FIG. 6, an example equipment graphic 600 is shown, according to some embodiments. Graphic 600 depicts an air handling unit (e.g., AHU 106) and various components thereof. For example, the AHU is shown to include a temperature sensor, a flow sensor, a smoke detector, a damper, and a fan. BMS 400 can be used to create and modify control logic that automates the operation of the equipment shown in graphic 600. The control logic can greatly increase efficiency and performance of BMS 400 when configured properly. However, the control logic can be difficult to understand and modify, thus leading to inefficiencies.

Figure 7:
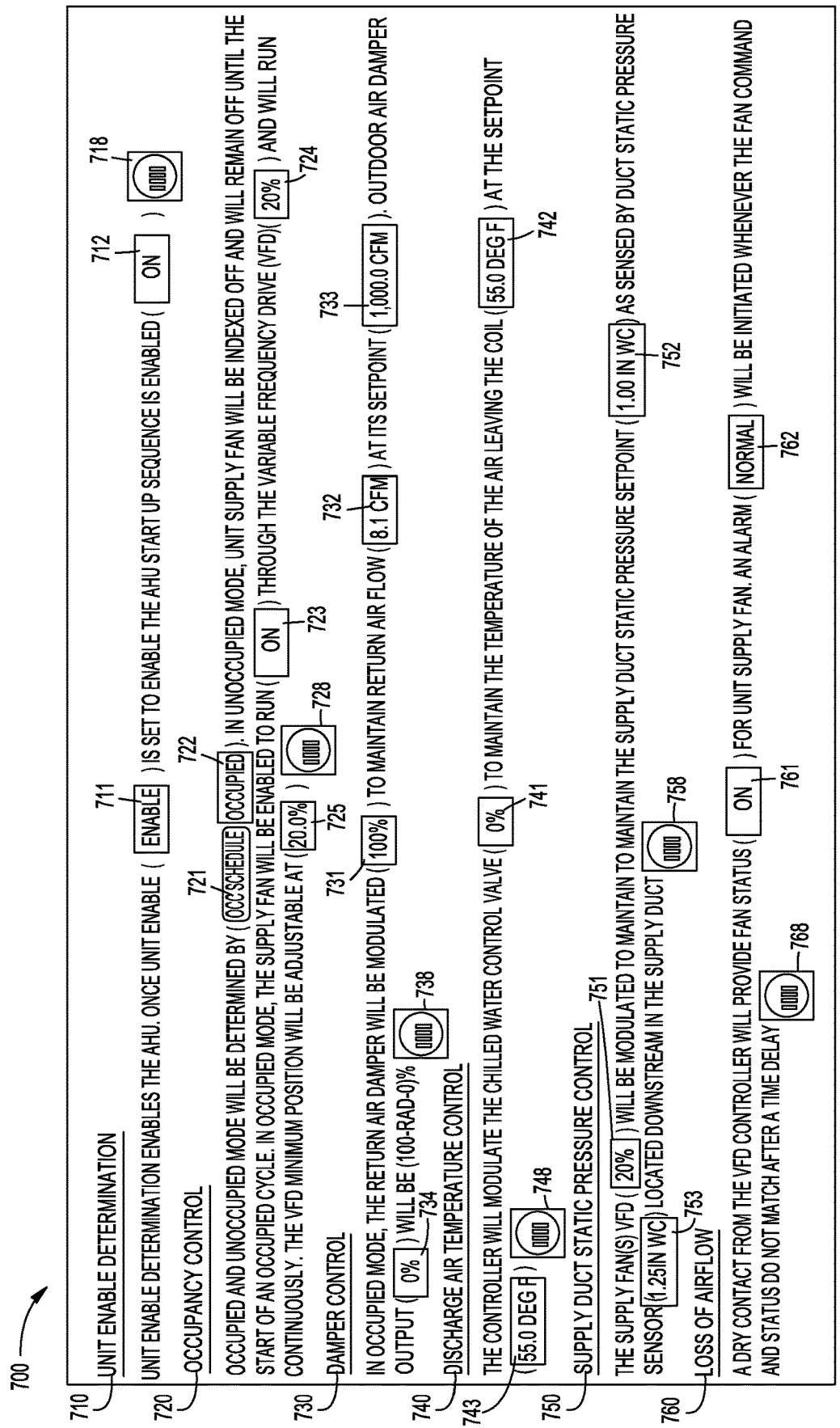
FIG. 7 is a drawing of an example dynamic control sequence interface associated with the BMS of FIG. 4, according to some embodiments.

Referring now to FIG. 7, an example dynamic control sequence interface 700 is shown, according to some embodiments. Interface 700 is shown to include six control sequences associated with the air handler depicted in graphic 600. Interface 700 can be configured to display complex control logic (e.g., computer code, ladder logic, function block logic, etc.) as human-readable text. Interface 700 allows user to easily monitor, troubleshoot, modify, and understand various control sequences associated with BMS 400. Interface 700 includes interactive text that can be selected by users to modify the control logic, create new control logic, or better understand the control logic. The interactive text and status indicators described below can change colors in order to alert users of potentially problematic conditions. Interface 700 can also display live data associated with building equipment (e.g., using data collector 528). The terms "status indicator" and "interactive text" as used below can be interchangeable.

In some embodiments, control sequences associated with BMS 400 are specified in a document (e.g., PDF, word document, text file, etc.) during the system design phase. For example, a design engineer can prepare a PDF file containing one or more control sequences that define how BMS 400 needs to work for a new building. The sequence of operations text provided by the design engineer can then be used by other personnel (e.g., application engineer) to create building automation and control logic that performs the required operations. For example, an application engineer can use controller configuration tool 534 to generate a controller application file including logic that meets the requirements provided by the design engineer. Interface 700 can then include the sequence of operations text along with links to live data (e.g., points) and editable control logic (e.g., setpoints). Interface 700 drives better commissioning, understanding, and troubleshooting experiences for personnel such as commissioning engineers, BMS operators, building stakeholders, etc.

Control sequence 710 depicts an example air handler startup sequence. Sequence 710 allows the user to see that a simple enable signal turns the air handler on and off. The enable signal is presented to the user as interactive text 711. The user can select (e.g., click or touch) interactive text 711 to view and/or modify the enable signal. In addition, sequence 710 is shown to include a status indicator 712 that indicates whether the air handler is currently on or off. Sequence 710 also includes a trend icon 718 that can be selected by the user in order to view historical data associated with sequence 710. For example, the user can click trend icon 718 to view the operating status of the air handler over the last week.

Control sequence 720 depicts an example occupancy control sequence. BMS 400 can be configured to adjust various control parameters according to an occupancy schedule and/or readings from one or more occupancy sensors. For example, an occupancy schedule can indicate that BMS 400 expects building 10 to be occupied during business hours and unoccupied overnight. Sequence 720 indicates to the user that occupied and unoccupied mode will be determined by an occupancy schedule. The user can select interactive text 721 in order to view and/or edit the occupancy schedule. In addition, status indicator 722 shows the user whether the current mode is occupied or unoccupied. Sequence 720 also indicates to the user that, when in unoccupied mode, the supply fan will be turned off. Further, when in occupied mode, the supply fan will be turned back on and driven by a variable frequency drive (VFD). Sequence 720 includes a status indicator 723 that shows the user whether the supply fan is currently on or off. Sequence 720 also includes a status indicator 724 that shows the user the current VFD output. The VFD output can be expressed in hertz (Hz), rotations per minute (rpm), or as a percentage (%) of the maximum VFD output, for example. Sequence 720 also includes interactive text 725 that can be selected in order to view and/or modify the minimum VFD output. In addition, sequence 720 include a trend icon 728 that can be selected by the user in order to view historical data associated with sequence 720.

Control sequence 730 depicts an example damper control sequence. Sequence 730 indicates to the user that a return air damper associated with the air handler is modulated in order to maintain an air flow setpoint. Sequence 730 includes interactive text 731 that can be selected by the user in order to view and/or modify the position of the return air damper. For example, the return air damper can be moved between a fully-open (e.g., 100%) and fully-closed (e.g., 0%) position in order to control air flow. Sequence 730 also includes a status indicator 732 that shows a current reading of return air flow and interactive text 733 that can be selected by the user in order to view and/or modify the return air flow setpoint. Air flow can be expressed in units of cubic feet per minute (CFM). Sequence 730 also includes interactive text 734 that can be selected by the user in order to view and/or modify an outdoor air damper position. In addition, sequence 730 includes a trend icon 738 that can be selected by the user in order to view historical data associated with sequence 730.

Control sequence 740 depicts an example discharge air temperature control sequence. Sequence 740 can control the temperature of air leaving the air handler to cool a room of building 10, for example. Sequence 740 indicates to the user that a controller modulates a chilled water valve (e.g., valve 346) in order to control the flow of chilled fluid through a cooling coil (e.g., coil 334). The temperature of air leaving the cooling coil depends on the flow of chilled fluid through the coil. Sequence 740 is shown to include interactive text 741 that the user can select in order to view and/or modify the position of the chilled water valve. Sequence 740 also includes a status indicator 742 that shows the temperature of air leaving the cooling coil and interactive text 743 that the user can select in order to view and/or modify the discharge air temperature setpoint. In addition, sequence 740 includes a trend icon 748 that can be selected by the user in order to view historical data associated with sequence 740.

Control sequence 750 depicts an example supply duct static pressure control sequence. Sequence 750 can control static pressure in the supply duct of the air handler by modulating the output of a VFD that drives one or more supply fans. Sequence 750 is shown to include interactive text 751 that can be selected by the user in order to view and/or modify the output of the VFD. Sequence 750 also includes interactive text 752 that can be selected by the user in order to view and/or modify a supply duct static pressure setpoint and a status indicator 753 that shows a live reading of supply duct static pressure. In addition, sequence 750 includes a trend icon 758 that can be selected by the user in order to view historical data associated with sequence 750.

Control sequence 760 depicts an example loss of airflow control sequence. Sequence 760 can trigger an alarm if a supply fan associated with the air handler does not respond to commands as expected. For example, if the supply fan status does not match the supply fan command after a predefined period of time, then the alarm can be triggered. Sequence 760 includes a status indicator 761 that shows whether the supply fan is on or off and a status indicator 762 that shows the status of the alarm. Sequence 760 indicates to the user that the supply fan status reading shown in indicator 761 originates from a dry contact of a VFD controller associated with the supply fan. In addition, sequence 760 includes a trend icon 768 that can be selected by the user in order to view historical data associated with sequence 760.

Figure 8:
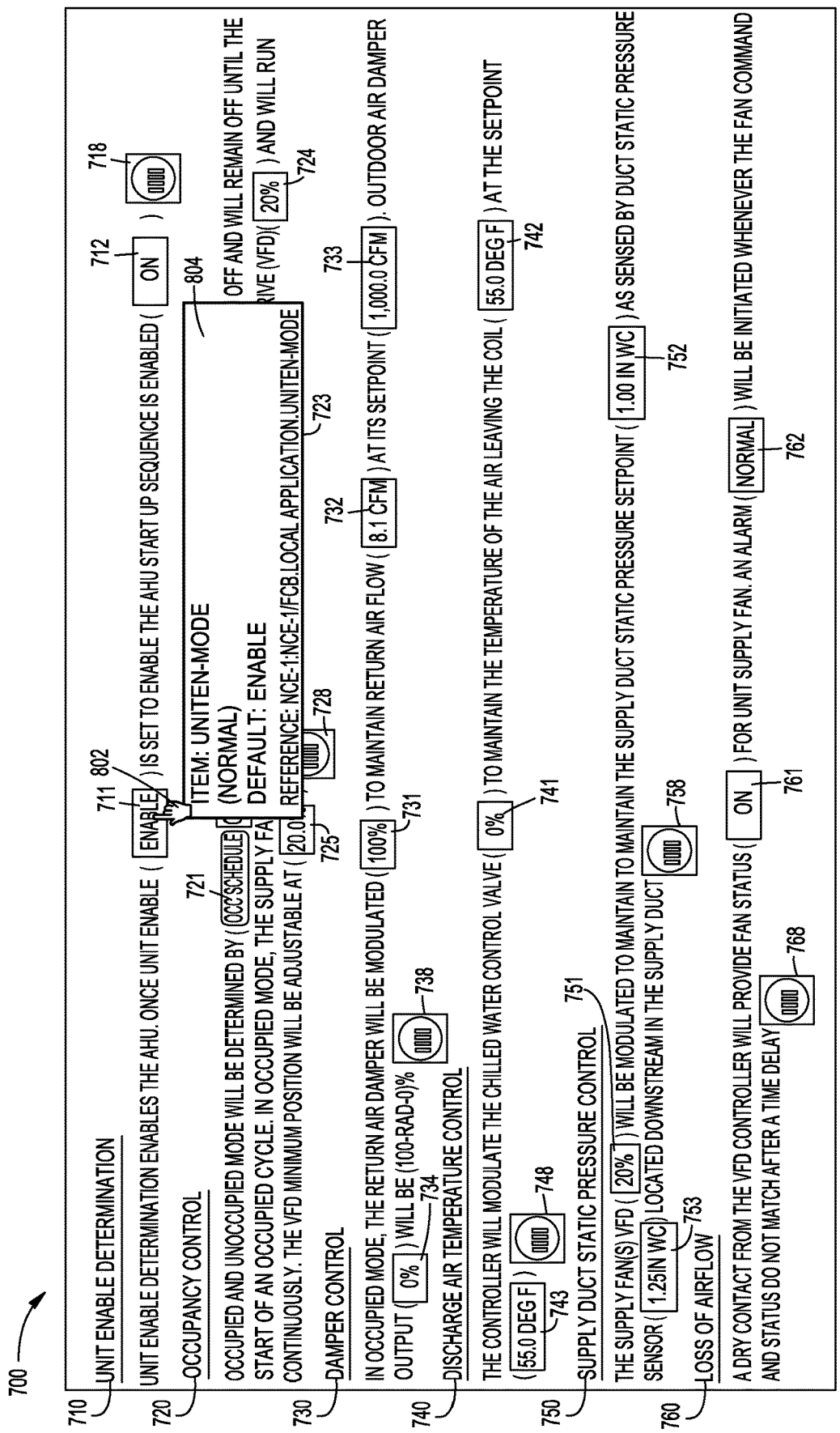
FIG. 8 is a drawing of another example dynamic control sequence interface associated with the BMS of FIG. 4, according to some embodiments.
Figure 9:
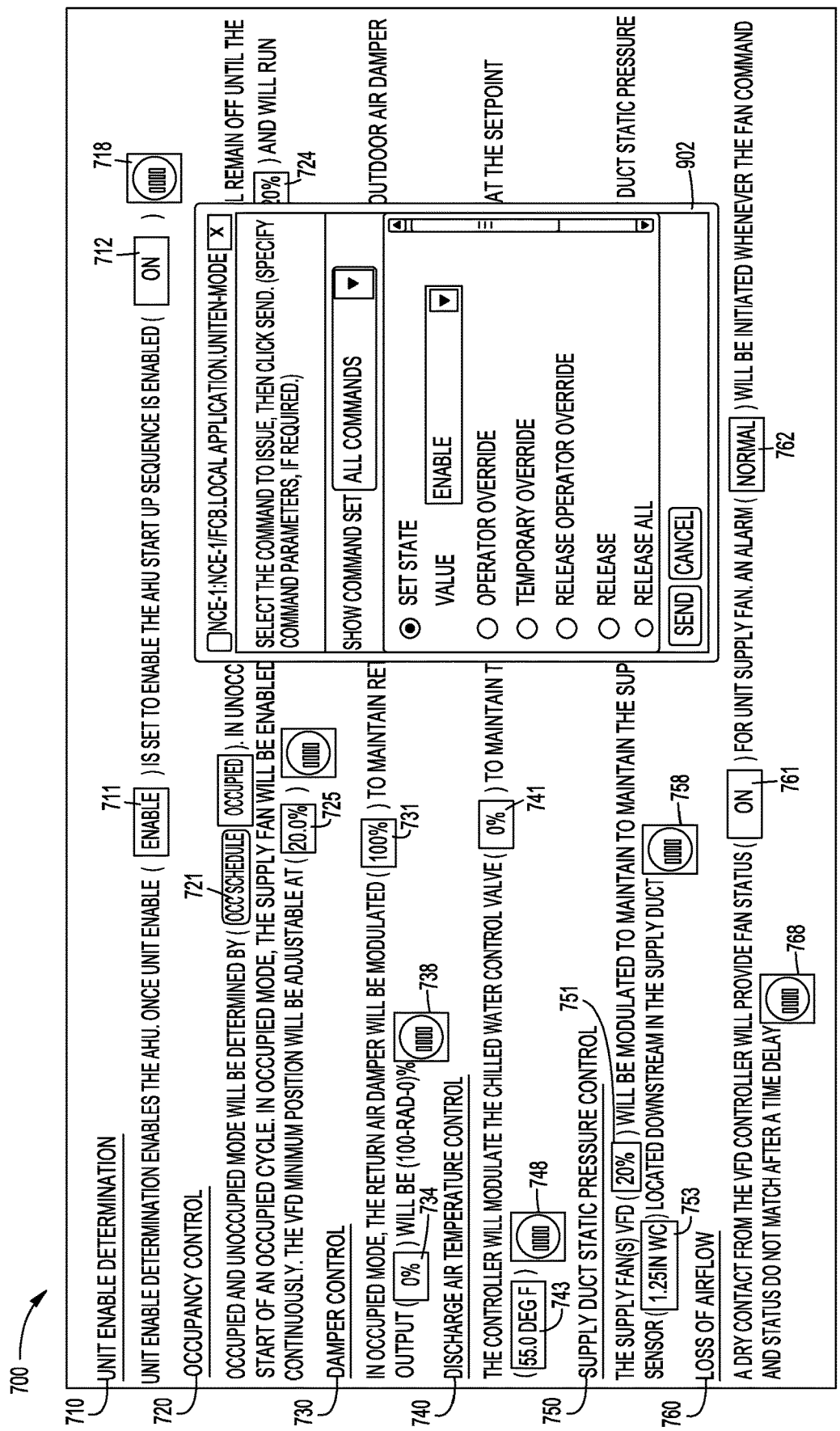
FIG. 9 is a drawing of another example dynamic control sequence interface associated with the BMS of FIG. 4, according to some embodiments.

FIG. 8 depicts another example of interface 700, according to some embodiments. In FIG. 8, the user has moved a pointer 802 (e.g., mouse) over interactive text 711. As a result, a window 804 showing various information about the data displayed as interactive text 711 appears. The information in window 804 can provide useful information to the user about interactive text 711. For example, window 804 conveys to the user that the default setting for the air handler enable signal is "enable." FIG. 9 depicts another example of interface 700, according to some embodiments. In FIG. 9, the user has selected (e.g., clicked) interactive text 711 and, as a result, a dialog box 902 appears. The user can modify the enable signal and/or provide various other commands to BMS 400 through dialog box 902. Many different types of windows and dialog boxes similar to window 804 and dialog box 902 can be displayed to the user through interface 700. These interfaces can help convey important information about control sequences associated with BMS 400 and can receive input regarding the control sequences.

Figure 10:
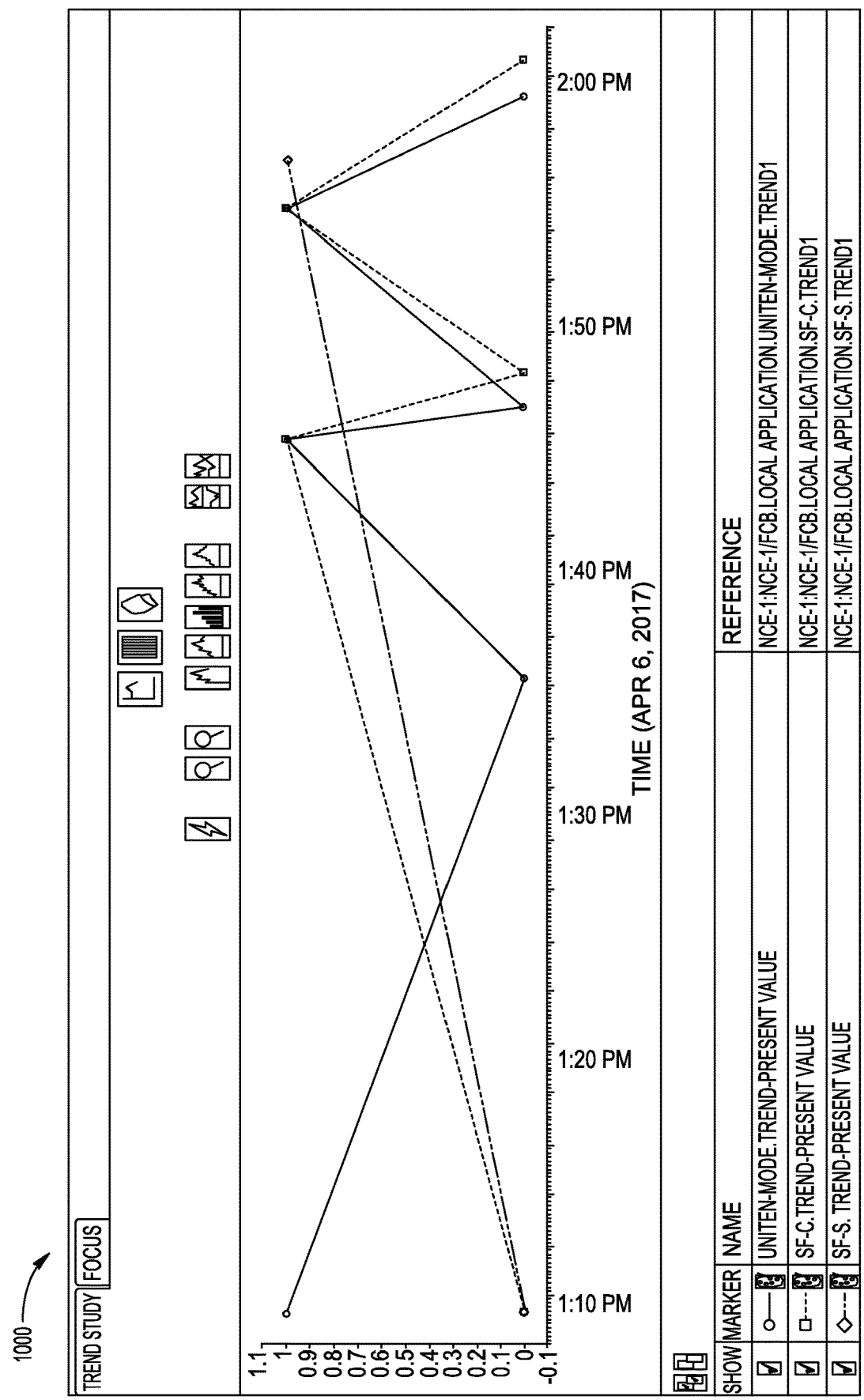
FIG. 10 is a drawing of an example historical data trend interface associated with the BMS of FIG. 4, according to some embodiments.
Figure 11:
FIG. 11 is a drawing of an example occupancy schedule interface associated with the BMS of FIG. 4, according to some embodiments.

FIG. 10 depicts an example trend 1000 associated with interface 700, according to some embodiments. The user can view trend 1000 by selecting trend icon 718, for example. Trend 1000 shows a graph of various data associated with sequence 710 over a one hour time period. FIG. 11 depicts an example occupancy schedule 1100 associated with BMS 400, according to some embodiments. The user can view occupancy schedule 1100 by selecting interactive text 721, for example. Occupancy schedule 1100 shows that a building is expected to be occupied from about 6:00 AM to 6:00 PM on each day of the week. The user can easily edit occupancy schedule 1100 by clicking edit button 1102.

Turning now to FIGS. 12-21, systems and methods for a plug and play workflow associated with BMS 400 are shown, according to various embodiments. For example, users can create controller application files using controller configuration tool 534. In order to do so, the users may enter a variety of information about building equipment and other relationships associated with the controller that can be stored in metadata 536. Information contained in controller metadata 536 can be leveraged by various components of BMS 400 in order automate processes, reduce inefficiencies, and improve user experience. For example, system configuration tool 530 can be configured to automatically read a variety of data from controller application files in order to populate relationship tree 532 and generate equipment graphics (e.g., graphics from library 526). The ability to leverage information across BMS 400 in this manner is aided by the implementation of common data model 522 and tag library 524. As a result, increased efficiency and time savings can be achieved during processes such as commissioning. The time savings can be realized by a variety of personnel such as application engineers and commissioning engineers, for example.

Figure 12:
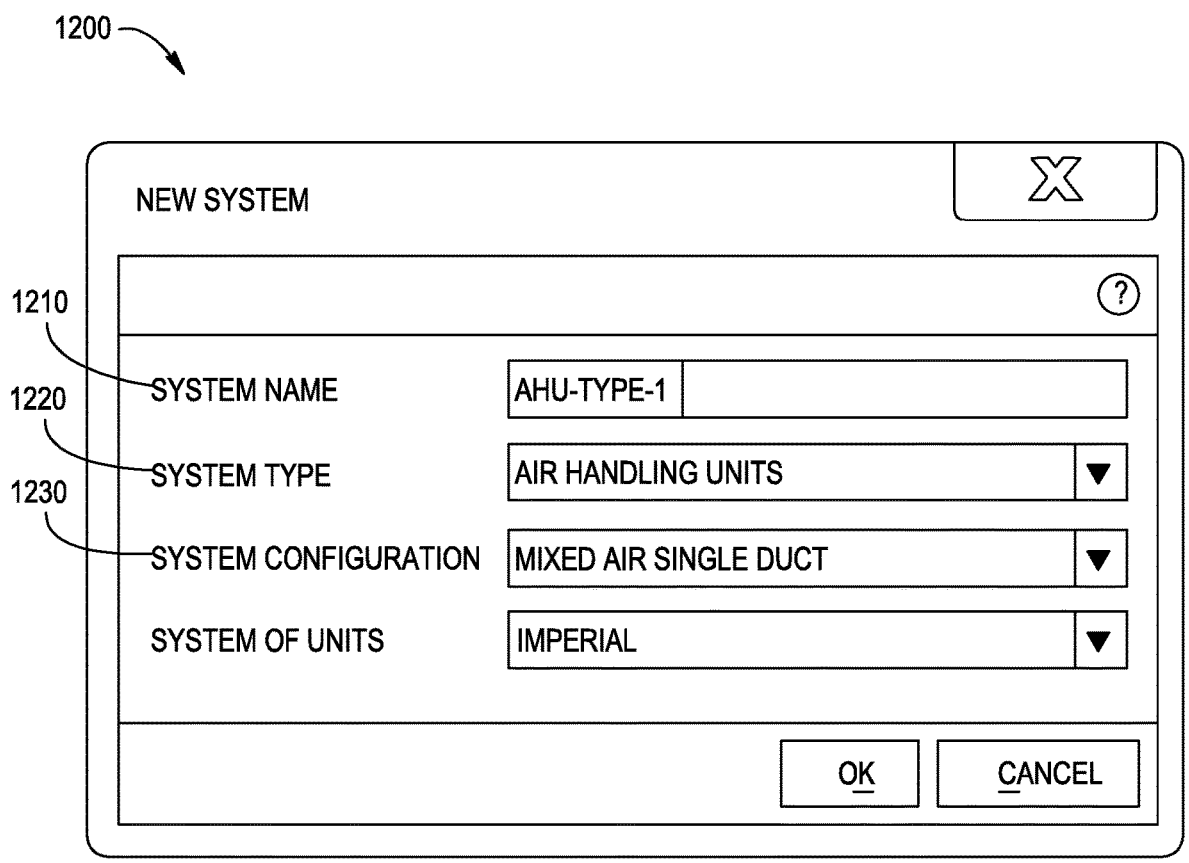
FIG. 12 is a drawing of an example new system interface associated with the BMS of FIG. 4, according to some embodiments.

FIG. 12 depicts an example new system dialog box 1200, according to some embodiments. A controller application file can contain one or more systems (e.g., building equipment), each of which can be configured in part by providing system information via dialog box 1200. Dialog box 1200 includes a system name field 1210. The system name in field 1210 can be used to identify a template controller application file, for example. Dialog box 1200 can also prompt the user to input a system type in field 1220 to identify a type of building equipment. This system type information can be used to identify relevant equipment graphics contained in graphics library 526. Dialog box 1200 further prompts the user to enter a system configuration in field 1230 used to identify a subtype of equipment. For example, as shown in dialog box 1200, the user has specified that the equipment type is an air handling unit in field 1220 and that the equipment subtype is a mixed air single duct AHU in field 1230. The template controller application file, equipment type, and equipment subtype can be stored in controller metadata 536.

Figure 13:
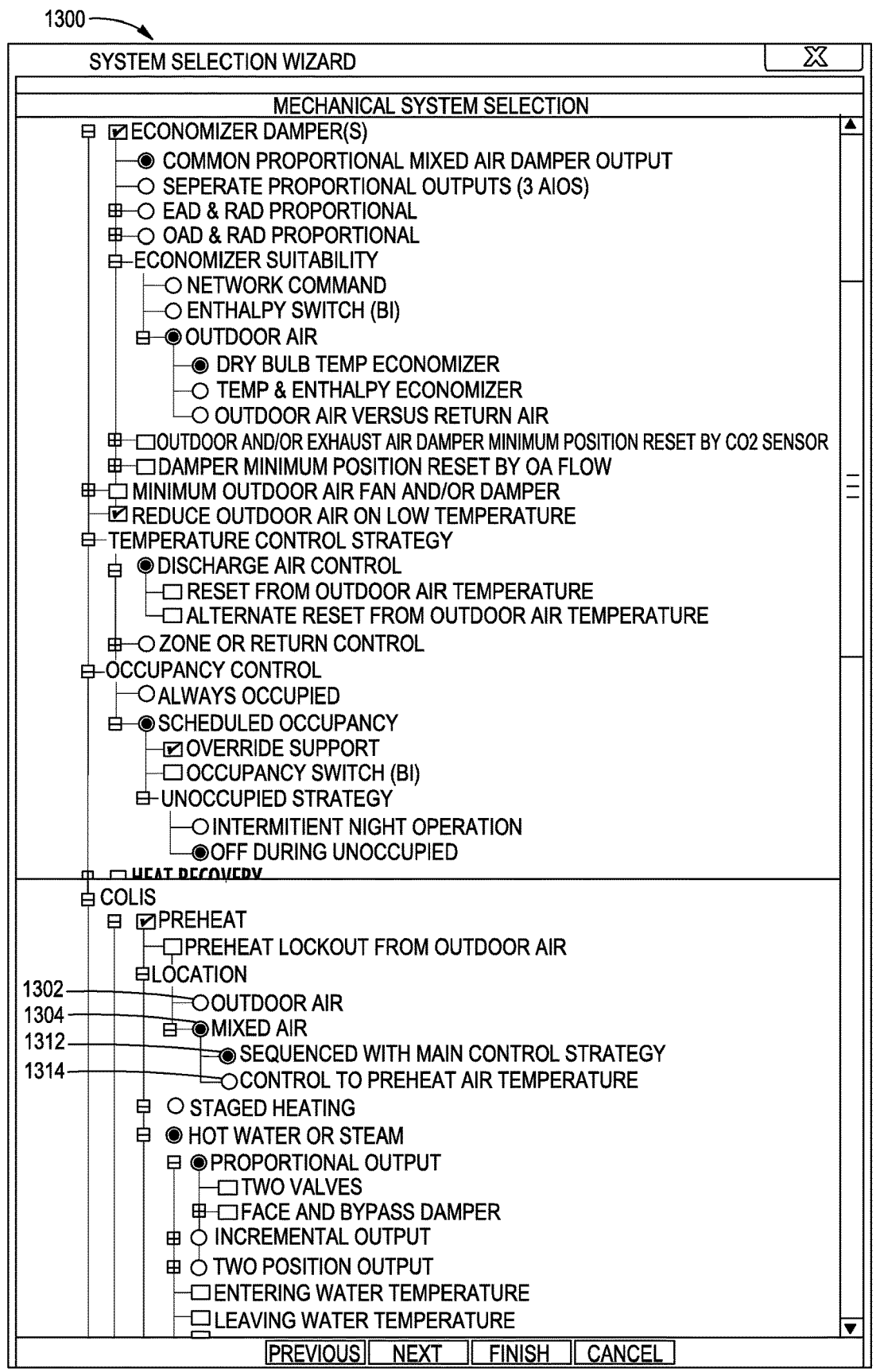
FIG. 13 is a drawing of an example system selection interface associated with the BMS of FIG. 4, according to some embodiments.

Turning now to FIG. 13, an example system selection wizard 1300 is shown, according to some embodiments. Wizard 1300 can be presented to users of BMS 400 in order to receive input regarding relationships between equipment, devices, and points within the system as well as desired control strategies. For example, the user can specify whether a preheat coil associated with the air handler is located in an outdoor air duct or a mixed air duct by selecting point 1302 or point 1304, respectively. In addition, the user can specify whether this coil should be sequenced with the main control strategy or controlled according to the preheat air temperature by selecting point 1312 or point 1314, respectively. The information entered by the user via wizard 1300 can be used to finalize and create a controller application file. Information regarding equipment and point relationships as well as control strategies can be stored within controller metadata 536.

Turning now to FIG. 14, an example system information interface 1400 is shown, according to some embodiments. Interface 1400 shows a variety of system information such as the system name, enablement, revision, standard version, language, and units. Interface 1400 also shows various system relationships 1410 such as equipment, device, and spatial relationships. In some embodiments, relationships 1410 are auto-populated by importing a room schedule. While only one system is shown in interface 1400 (AHU-1), it is possible to generate a controller application file that controls multiple systems. For example, a single controller application file can be loaded onto a single device in order to control both an air handling unit and an exhaust fan. The user can make edits to the system by clicking edit button 1402 of interface 1400. Information shown in interface 1400 can be contained in controller metadata 536.

Figure 15:
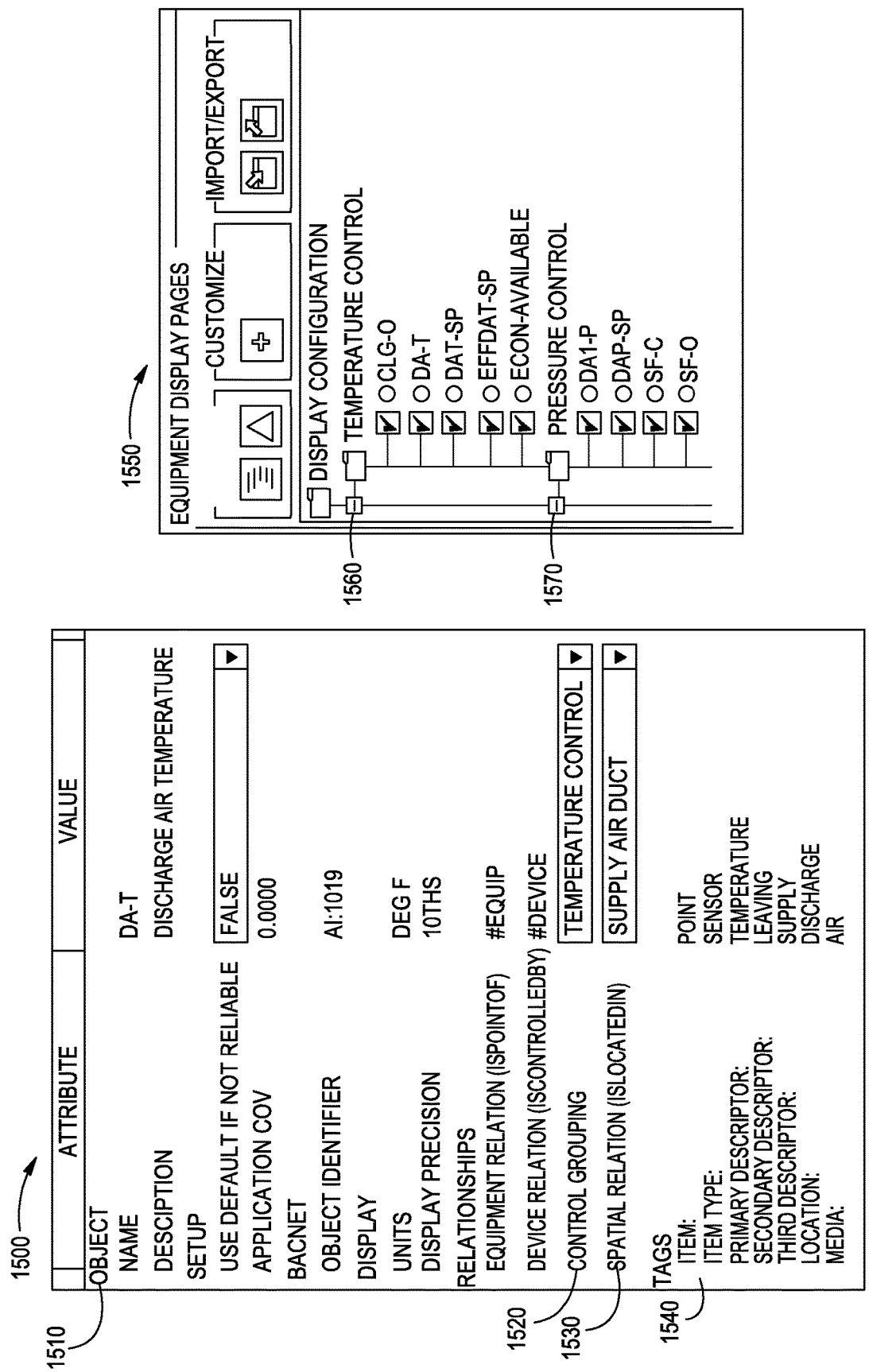
FIG. 15 is a drawing of an example point information interface associated with the BMS of FIG. 4, according to some embodiments.

Turning now to FIG. 15, an example point information interface 1500 is shown, according to some embodiments. The point information interface can be configured to display a variety of information about points within BMS 400. For example, interface 1500 specifically shows information about a discharge air temperature point 1510 (e.g., sensor 362). Interface 1500 shows that data related to point 1510 is displayed in degrees Fahrenheit with precision of one tenth of one degree Fahrenheit. Temperature reading from point 1510 can be collected by data collector 528, for example. Interface 1500 is also shown to include a control grouping field 1520 that can be used to associate a point with a control strategy. In the example shown in interface 1500, discharge air temperature point 1510 has been associated with a temperature control grouping. Interface 1500 also includes a spatial relation field 1530 that can be used to identify the physical location of a point. In this case, discharge air temperature point 1510 is located in a supply air duct. Interface 1500 also includes various tags 1540 that can be associated with a point. Tags 1540 can be defined by and stored in tag library 524, for example. For points that are only used for monitoring purposes and are not associated with any control logic, the control grouping field 1520 may be left blank. Point information such as shown in interface 1500 can be stored within controller metadata 536.

Still referring to FIG. 15, interface 1550 shows an example of various points that have been assigned to building equipment, according to some embodiments. For example, interface 1550 can show all points that have been associated with the air handler of graphic 600. As shown, interface 1550 includes a plurality of points that have been assigned to a temperature control group 1560 and a plurality of points that have been assigned to a pressure control group 1570. Interface 1550 can provide users of BMS 400 with a simple and intuitive way to view, edit, and monitor points.

Figure 16A:
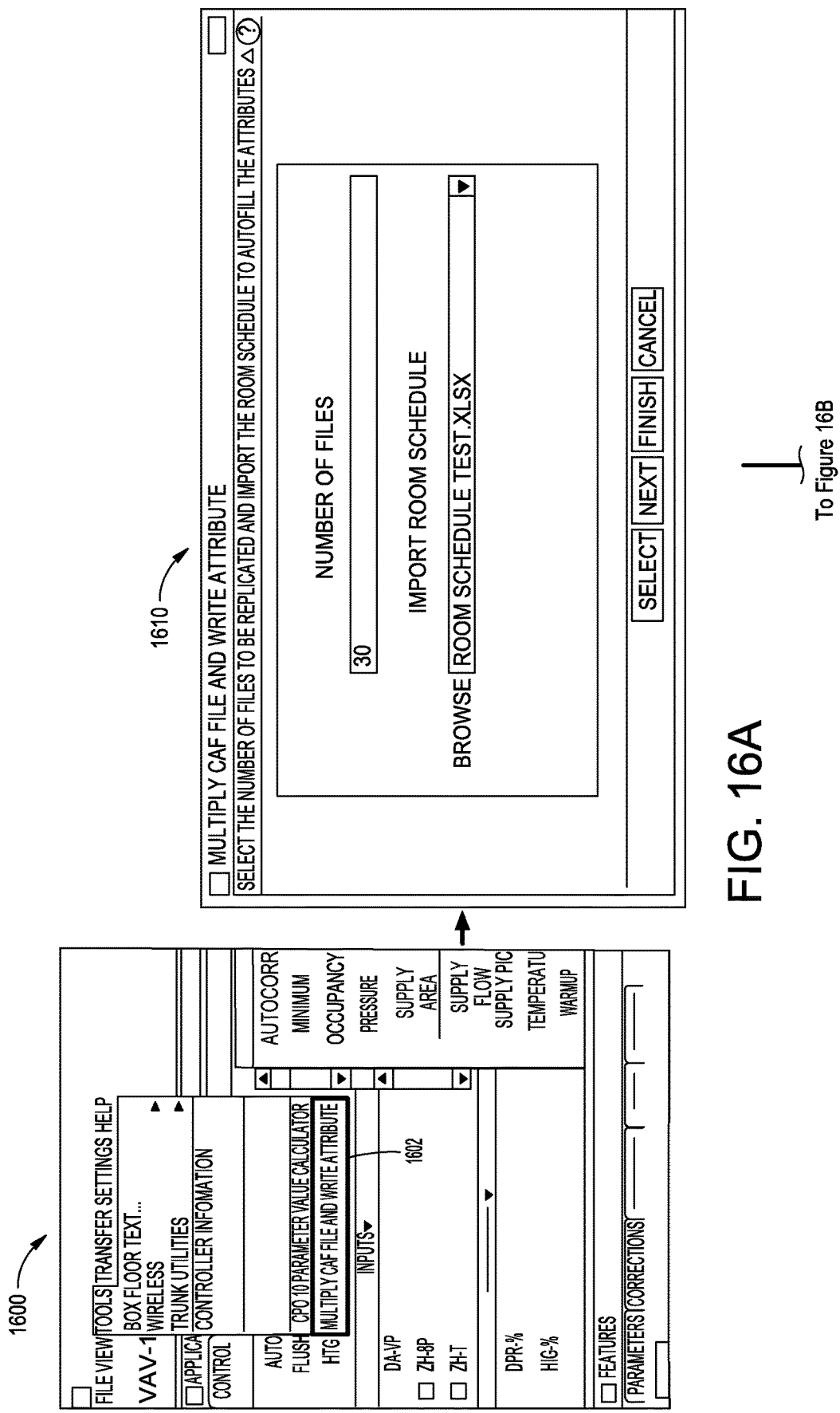
FIGS. 16A-16B are drawings of example interfaces associated with the BMS of FIG. 4, according to some embodiments.
Figure 16B:
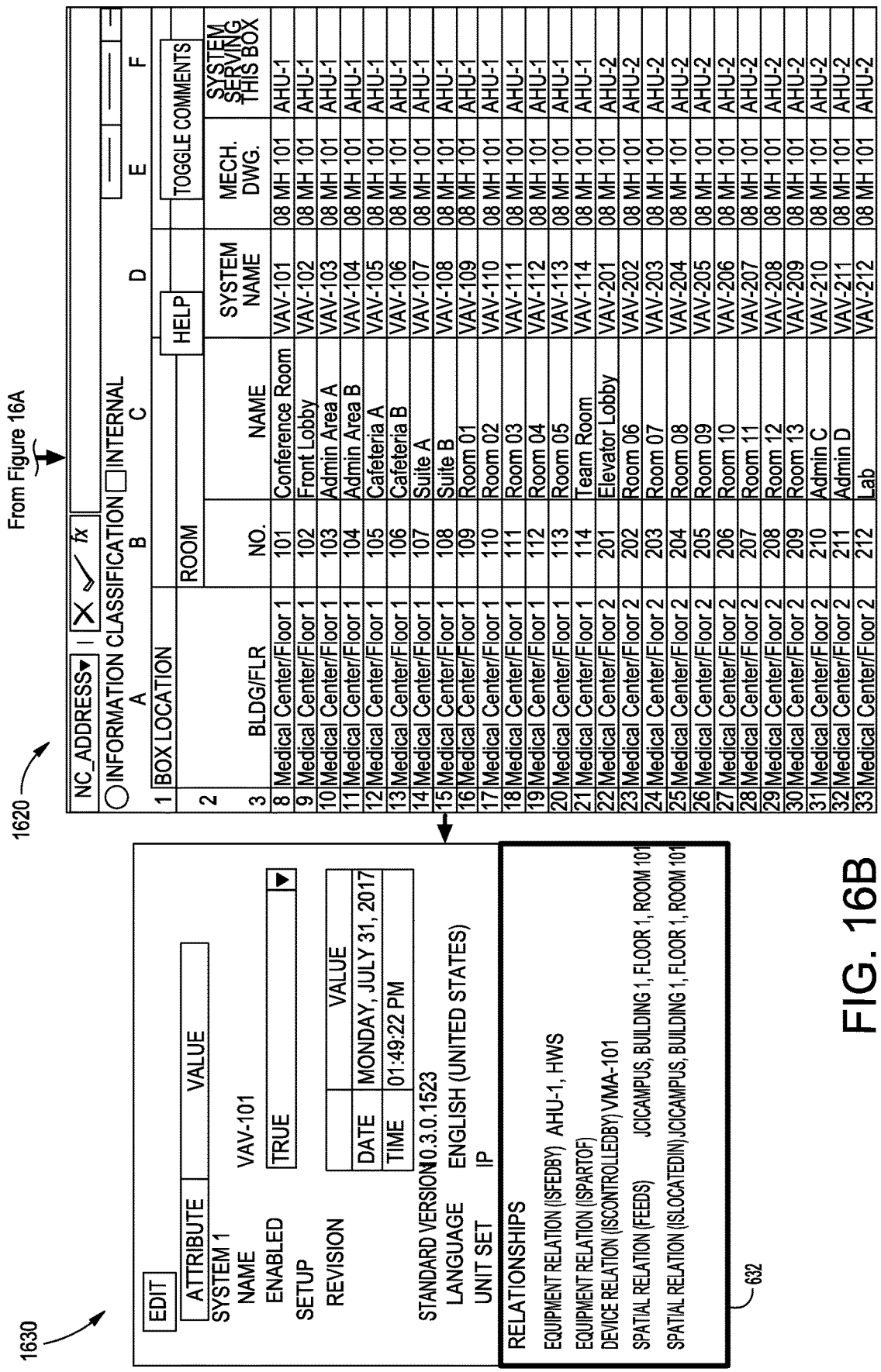

Turning now to FIGS. 16A and 16B, additional examples of interfaces associated with BMS 400 are shown, according to various embodiments. In some embodiments, each of the interfaces shown in FIGS. 16A and 16B are associated with controller configuration tool 534. FIG. 16A depicts an example interface 1600 through which users can access a controller application file multiply and write feature 1602. Feature 1602 allows users of BMS 400 to easily replicate typical controller application files and automatically populate relationships (e.g., relationships 1410) and other attributes by importing a room schedule. FIG. 16A also depicts an example dialog box 1610 through which users can specify a number of controller application files to replicate and select a room schedule to import. FIG. 16B depicts an example room schedule 1620 including various relationships between buildings floors, spaces, rooms, and building equipment. For example, air handler AHU-1 is shown to serve variable air volume (VAV) box VAV-101 in order to control heating and cooling of a conference room on the first floor of a medical center. FIG. 16B also depicts another example system information interface 1630. Interface 1630 shows similar information as interface 1400. However, as shown, BMS 400 has automatically populated relationships 1632 according to room schedule 1620. Information contained in room schedules can also be included in controller metadata 536.

Figure 17:
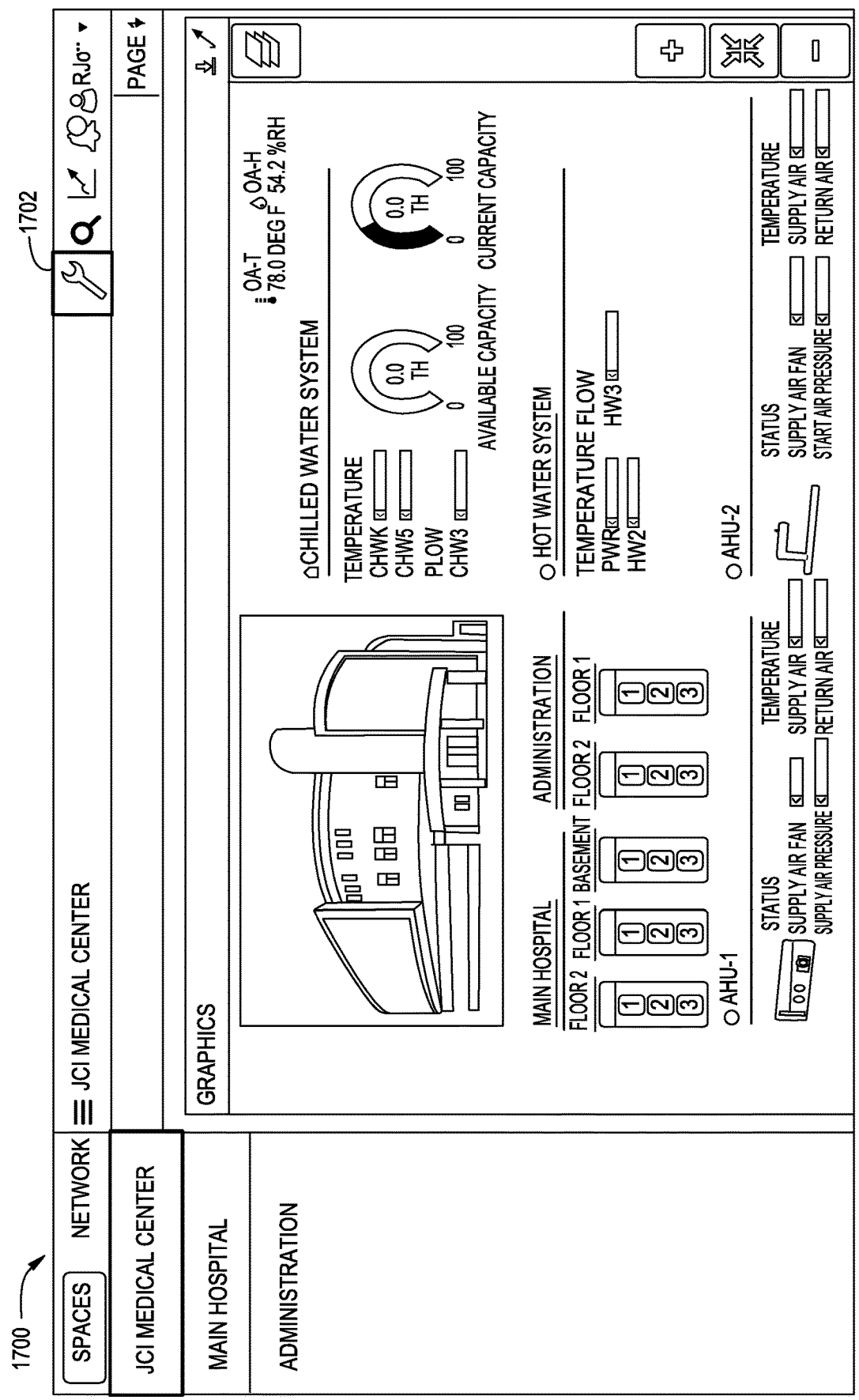
FIG. 17 is a drawing of another example interface associated with the BMS of FIG. 4, according to some embodiments.

Turning now to FIGS. 17-21, an example scenario in which the plug and play workflow associated with BMS 400 can be utilized is shown, according to various embodiments. In FIGS. 17-21, a portion of a medical center is renovated. The renovation results in a newly created conference room that is served by a newly added VAV box. A technician has received a fully-programmed VMA (variable air volume modular assembly) controller for the VAV box. The technician installs the controller and connects it to the building network (e.g., network 446). FIG. 17 depicts an example user interface 1700. After the technician has connected the new VAV controller to the building network, settings icon 1702 can be configured to flash or otherwise alert the user to select icon 1702.

Figure 18:
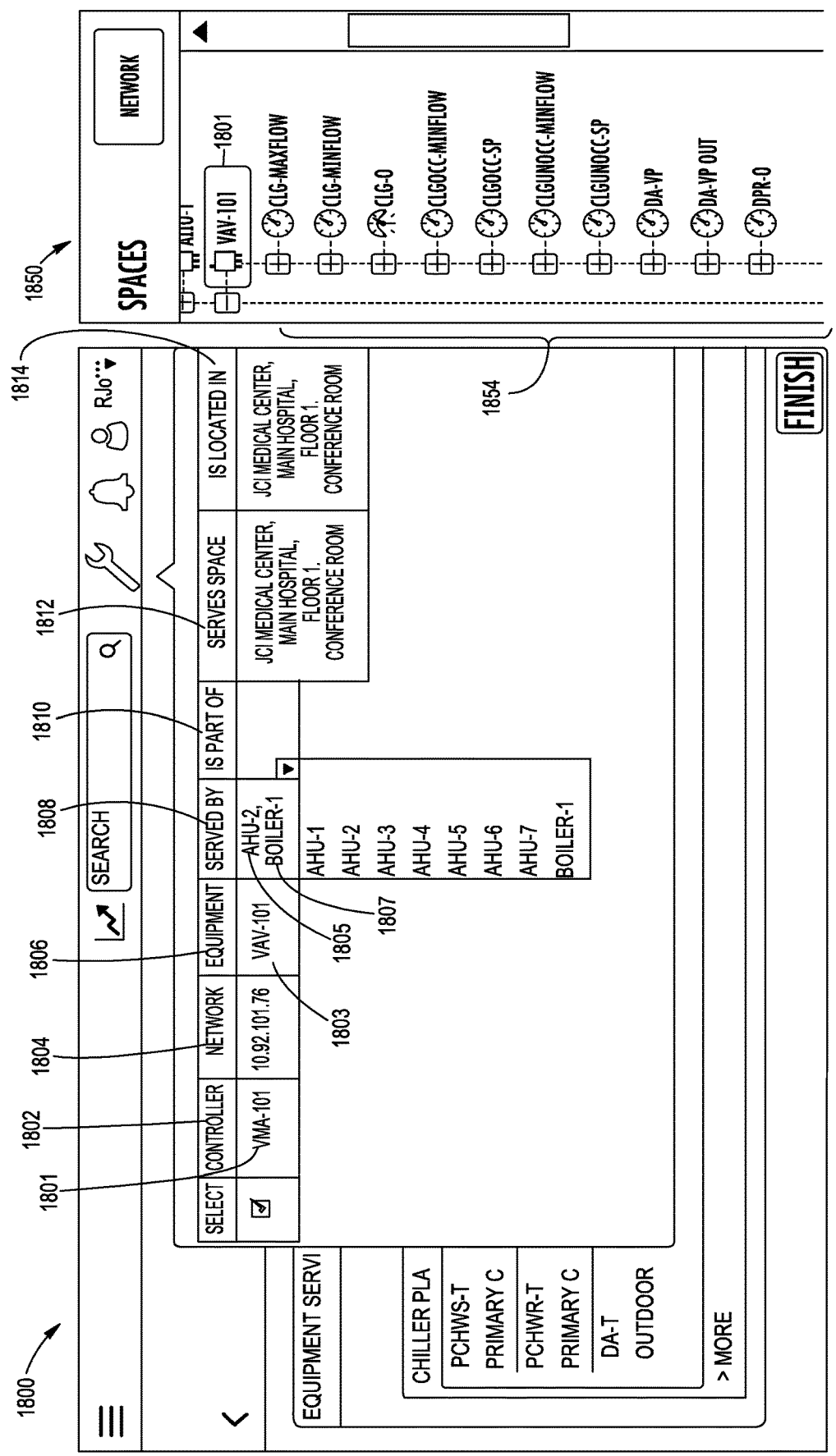
FIG. 18 is a drawing of another example interface associated with the BMS of FIG. 4, according to some embodiments.

FIG. 18 depicts another example user interface 1800, according to some embodiments. Interface 1800 can be provided to the user after selecting icon 1702, for example.

Interface 1800 shows the user that the new controller 1801 has been discovered and that BMS 400 has automatically discovered a variety of information about controller 1801. For example, BMS 400 can be configured to automatically read and this information by accessing controller metadata 536. Field 1802 shows the controller name (e.g., VMA-101), field 1804 shows the IP address of the controller, and field 1806 shows the equipment controlled by the controller (e.g., VAV box 1803). Field 1808 shows building equipment that VAV box 1803 is served by. In this case, VAV box 1803 is served by an air handler 1805 (e.g., AHU 106) and a boiler 1807 (e.g., boiler 104). In some embodiments, field 1808 includes a drop down menu through which users can modify the building equipment that serves VAV box 1803. In addition, fields 1810, 1812, and 1814 show various equipment, building, space, and zone relationships associated with the controller.

FIG. 18 also depicts an example relationship tree 1850, according to some embodiments. Relationship tree 1850 is an example of a relationship tree 532. Relationship tree 1850 shows relationships between various systems and devices connected to the building network. As shown, controller 1801 has been automatically populated within relationship tree 1850. In addition, a plurality of points 1854 (e.g., sensors) associated with VAV box 1803 have also been automatically populated within relationship tree 1850. All of the points associated with controller 1801 can be read from the controller metadata 536. The ability to automatically populate relationship tree 1850 in this manner can result in significant time savings for users of BMS 400.

Figure 19:
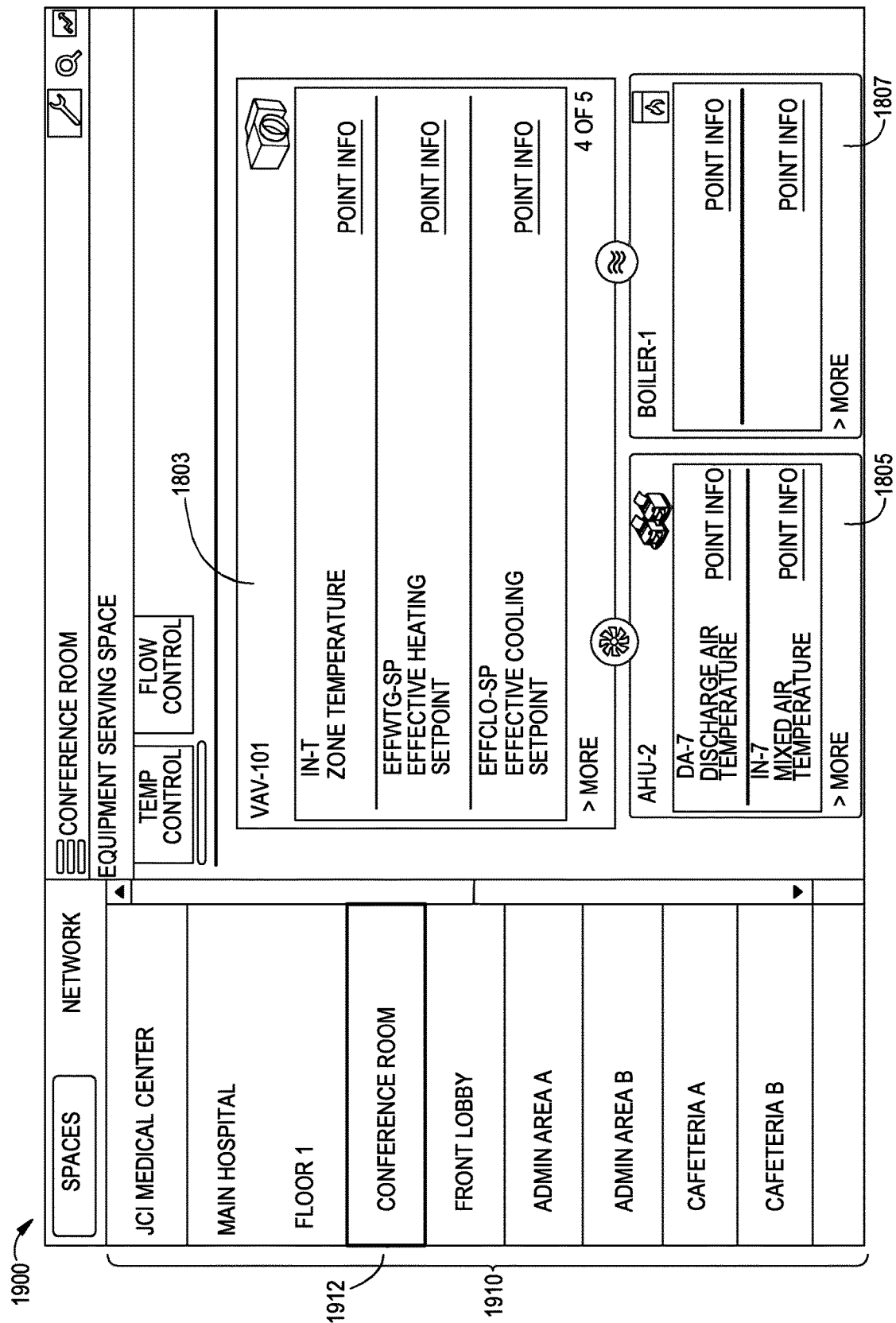
FIG. 19 is a drawing of another example interface associated with the BMS of FIG. 4, according to some embodiments.

Turning now to FIG. 19, another example user interface 1900 is shown, according to some embodiments. As shown, the new conference room 1912 has been automatically populated within relationship tree 1910. Relationship tree 1910 is another example of relationship tree 532. As shown, relationship tree 1910 includes various relationships between spaces (e.g., rooms and zones) within the medical center building. Interface 1900 also shows point information related to VAV box 1803, air handler 1805, and boiler 1807.

Figure 20:
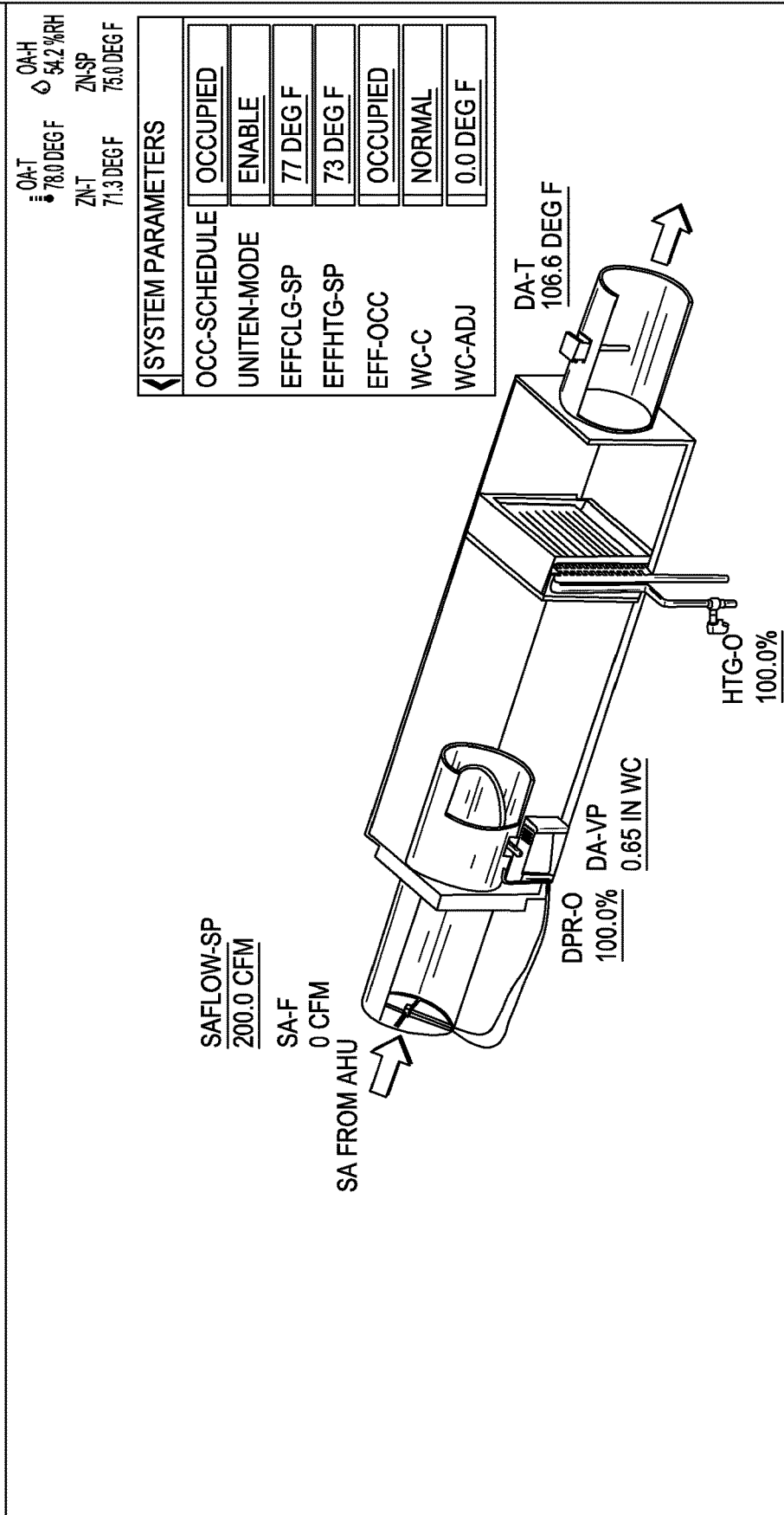
FIG. 20 is a drawing of another example equipment graphic associated with the BMS of FIG. 4, according to some embodiments.

Turning now to FIG. 20, another example building equipment graphic 2000 is shown, according to some embodiments. Graphic 2000 depicts VAV box 1803. Graphic 2000 can be automatically generated by BMS 400 by using information available in the controller metadata 536 of controller 1801. Graphic 2000 allows users of BMS 400 to easily view, understand, and edit data associated with VAV box 1803. For example, data collector 528 can provide live data to be displayed via graphic 2000. The live data can allow for easy troubleshooting (e.g., edit setpoints, trigger alarms, etc.) and monitoring of VAV box 1803.

Figure 21:
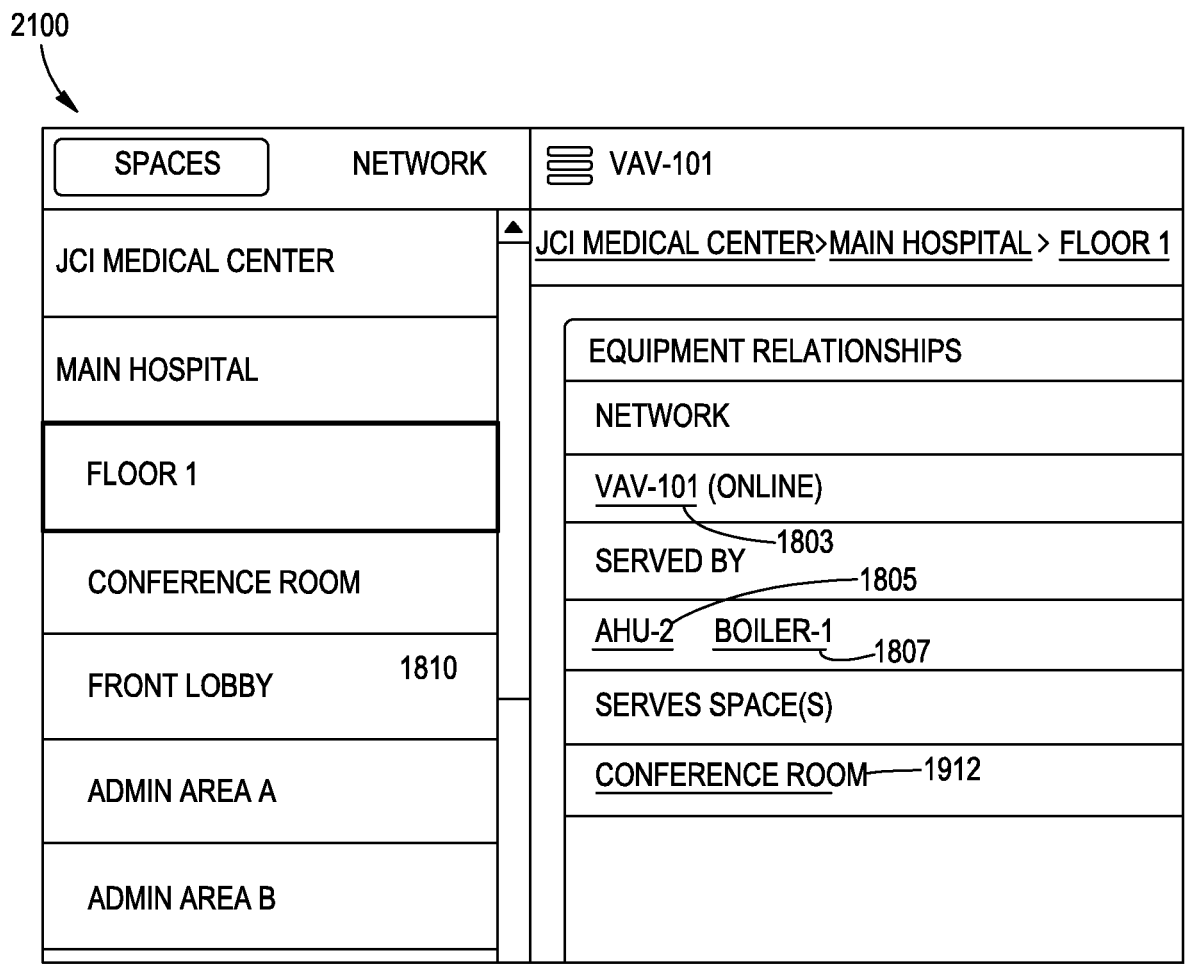
FIG. 21 is a drawing of another example interface associated with the BMS of FIG. 4, according to some embodiments.

Turning now to FIG. 21, another example user interface 2100 is shown, according to some embodiments. Interface 2100 shows another example of how building equipment relationships can be automatically populated by utilizing controller metadata 536. For example, through interface 2100, the user can see the online/offline status of VAV box 1803. In addition, the user can easily see that VAV box 1803 is served by air handler 1805 and boiler 1807 and serves the new conference room 1912.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method of controlling building equipment in a Building Management System (BMS), the method comprising:

presenting a user interface to a user on a user device;

displaying, on the user interface, building automation and control logic associated with the building equipment as human-readable text, the human-readable text comprising a written narrative that describes one or more functions performed by the building equipment in accordance with the building automation and control logic;

providing, on the user interface, interactive text within a sentence of the human-readable text, the interactive text modifiable by the user;
displaying, on the user interface, live building automation and control data associated with the building equipment within the sentence of the human-readable text;
receiving, via the user interface, an input from the user responsive to an interaction between the user and the interactive text;
modifying, by the BMS, the building automation and control logic in accordance with the input; and
executing, by a controller of the BMS, the building automation and control logic to control the building equipment.

2. The method of claim 1, wherein the method further comprises performing an occupancy control sequence, and wherein receiving the input from the user comprises receiving an occupancy schedule associated with the building equipment.

3. The method of claim 1, wherein the method further comprises performing an air flow control sequence, and wherein receiving the input from the user comprises receiving at least one of a fan status, a damper position, and a pressure setpoint.

4. The method of claim 1, wherein the method further comprises performing a flow control sequence, and wherein receiving the input from the user comprises receiving at least one of a valve position or a temperature setpoint.

5. The method of claim 1, further comprising providing a trend icon on the user interface, the trend icon selectable by the user in order to view historical data associated with the building equipment.

6. The method of claim 1, wherein the interactive text is selectable by the user and, in response to the user selecting the interactive text, the method further comprises displaying a dialog box and receiving the input from the user via the dialog box.

7. The method of claim 1, wherein the written narrative comprises both the interactive text and static text, the static text describing the one or more functions performed by the building equipment in accordance with the building automation and control logic, the method further comprising:
retrieving the static text from a first memory location;
retrieving the interactive text from a second memory location; and
combining the static text and the interactive text into the written narrative.

8. A Building Management System (BMS) comprising:
one or more computer-readable storage media having instructions stored thereon that, when executed by one or more processors, cause the one or more processors to:
present a user interface to a user on a user device;
display, on the user interface, building automation and control logic associated with building equipment as human-readable text, the human-readable text comprising a written narrative that describes one or more functions performed by the building equipment in accordance with the building automation and control logic;
provide, on the user interface, interactive text within a sentence of the human-readable text, the interactive text modifiable by the user;
display, on the user interface, live building automation and control data associated with the building equipment within the sentence of the human-readable text;
receive, via the user interface, an input from the user responsive to an interaction between the user and the interactive text; and
modify, by the BMS, the building automation and control logic in accordance with the input; and
a controller configured to execute the building automation and control logic to control the building equipment.

9. The BMS of claim 8, wherein the instructions cause the one or more processors to perform an occupancy control sequence, and wherein the input from the user comprises an occupancy schedule associated with the building equipment.

10. The BMS of claim 8, wherein the instructions cause the one or more processors to perform an air flow control sequence, and wherein the input from the user comprises at least one of a fan status, a damper position, and a pressure setpoint.

11. The BMS of claim 8, wherein the instructions cause the one or more processors to perform a flow control sequence, and wherein the input from the user comprises at least one of a valve position or a temperature setpoint.

12. The BMS of claim 8, wherein the instructions cause the one or more processors to provide a trend icon on the user interface, the trend icon selectable by the user in order to view historical data associated with the building equipment.

13. The BMS of claim 8, wherein the interactive text is selectable by the user and, in response to the user selecting the interactive text, the instructions cause the one or more processors to display a dialog box and receiving the input from the user via the dialog box.

14. The BMS of claim 8, wherein the written narrative comprises both the interactive text and static text, the static text describing the one or more functions performed by the building equipment in accordance with the building automation and control logic, and wherein the instructions cause the one or more processors to:
retrieve the static text from a first memory location;
retrieve the interactive text from a second memory location; and
combine the static text and the interactive text into the written narrative.

15. One or more non-transitory computer-readable storage media having computer-executable instructions stored thereon that, when executed by one or more processors, cause the one or more processors to:
present a user interface to a user on a user device;
display, on the user interface, building automation and control logic associated with building equipment as human-readable text, the human-readable text comprising a written narrative that describes one or more functions performed by the building equipment in accordance with the building automation and control logic;
provide, on the user interface, interactive text within a sentence of the human-readable text, the interactive text modifiable by the user;
display, on the user interface, building automation and control data associated with the building equipment within the sentence of the human-readable text;
receive, via the user interface, an input from the user responsive to an interaction between the user and the interactive text; and
modify the building automation and control logic in accordance with the input for execution of the building automation and control logic to control the building equipment.

16. The one or more non-transitory computer-readable storage media of claim 15, wherein the one or more processors are further configured to perform a control sequence associated with the building automation and control logic, the control sequence comprising an air flow control sequence, wherein the input from the user comprises at least one of a fan status, a damper position, and a pressure setpoint.

17. The one or more non-transitory computer-readable storage media of claim 15, wherein the one or more processors are further configured to perform a control sequence associated with the building automation and control logic, the control sequence comprising a flow control sequence, and wherein the input from the user comprises at least one of a valve position or a temperature setpoint.

18. The one or more non-transitory computer-readable storage media of claim 15, wherein the instructions cause the one or more processors to provide a trend icon on the user interface, the trend icon selectable by the user in order to view historical data associated with the building equipment.

19. The one or more non-transitory computer-readable storage media of claim 15, wherein the interactive text is selectable by the user and, in response to the user selecting the interactive text, the instructions cause the one or more processors to display a dialog box and receiving the input from the user via the dialog box.

20. The one or more non-transitory computer-readable storage media of claim 15, wherein the written narrative comprises both the interactive text and static text, the static text describing the one or more functions performed by the building equipment in accordance with the building automation and control logic, and wherein the instructions cause the one or more processors to:
retrieve the static text from a first memory location;
retrieve the interactive text from a second memory location; and
combine the static text and the interactive text into the written narrative.

\* \* \* \* \*